United States Patent
Isozaki et al.

(10) Patent No.: US 6,282,242 B1
(45) Date of Patent: Aug. 28, 2001

(54) DATA COMPRESSION DEVICE THAT SWITCHES BETWEEN INTRA-FRAME CODING AND INTER-FRAME CODING

(75) Inventors: Masaaki Isozaki; Atsuo Yada; Takao Suzuki, all of Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/059,676

(22) Filed: Apr. 13, 1998

(30) Foreign Application Priority Data

Apr. 15, 1997 (JP) .................................................. 9-097096

(51) Int. Cl.⁷ ...................................................... H04N 7/18
(52) U.S. Cl. ................................ 375/240.04; 375/240.05; 375/240.6
(58) Field of Search ..................................... 348/384, 403, 348/404, 405, 419, 423, 461, 464; 375/240, 240.04, 240.05, 240.06, 240.07

(56) References Cited

U.S. PATENT DOCUMENTS

| | | | |
|---|---|---|---|
| 5,231,484 | * | 7/1993 | Gonzales et al. ..................... 348/405 |
| 5,963,256 | * | 10/1999 | Tahara ................................. 348/405 |
| 6,011,589 | * | 1/2000 | Matsuura et al. ..................... 348/413 |

* cited by examiner

*Primary Examiner*—Andy Rao
(74) *Attorney, Agent, or Firm*—Frommer Lawrence & Haug, LLP.; William S. Frommer; Joe H. Shallenburger

(57) ABSTRACT

A data compression device for correctly allotting limited amounts of data and performing high image quality compression of video data by means of a method suitable for an authoring device such as the MPEG (Moving Picture Experts Group) technique so that when the desired amount of data for compression is set based on the data quantity detected by the previous data compression processing, the target bit quantity is set in specified block units, allotted to separate frames and then corrected by means of the individual block structure.

4 Claims, 19 Drawing Sheets

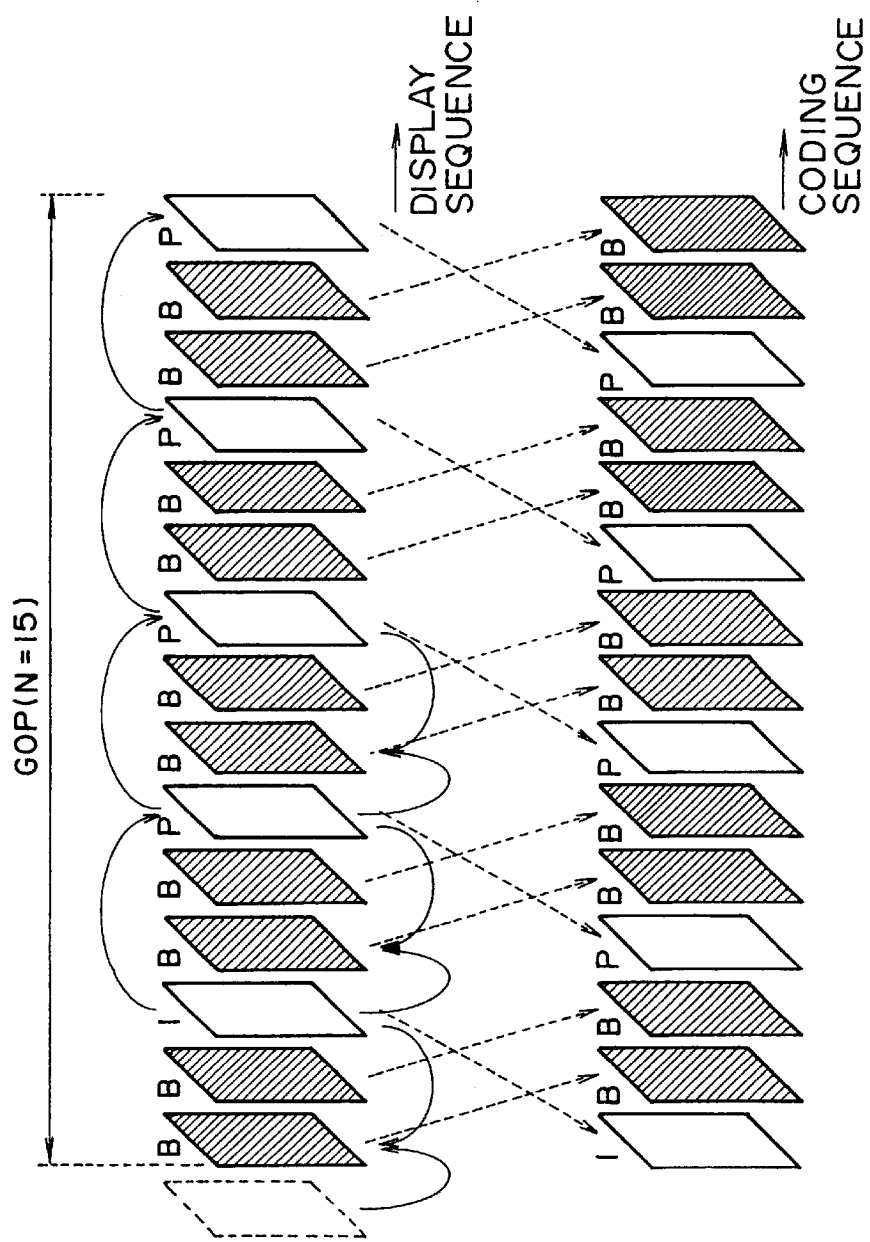

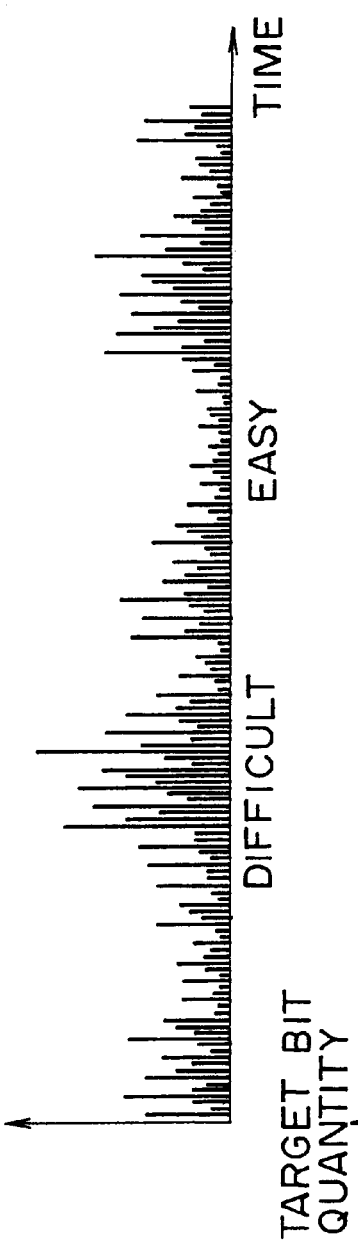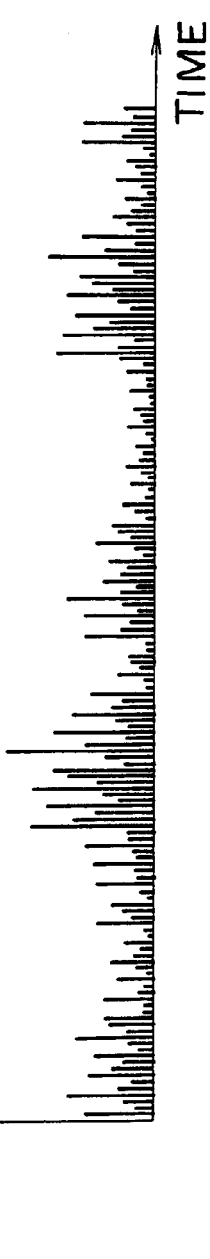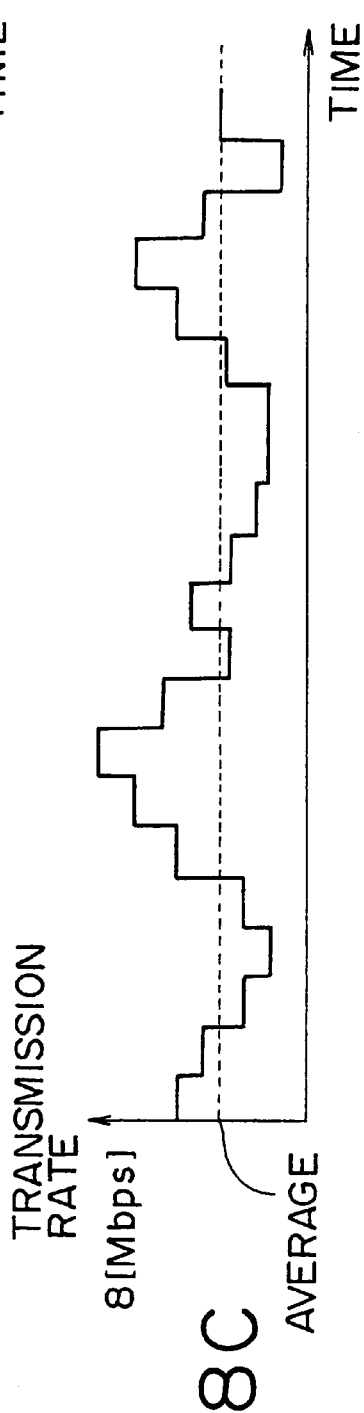
FIG. 8A
FIG. 8B
FIG. 8C

F I G. 9
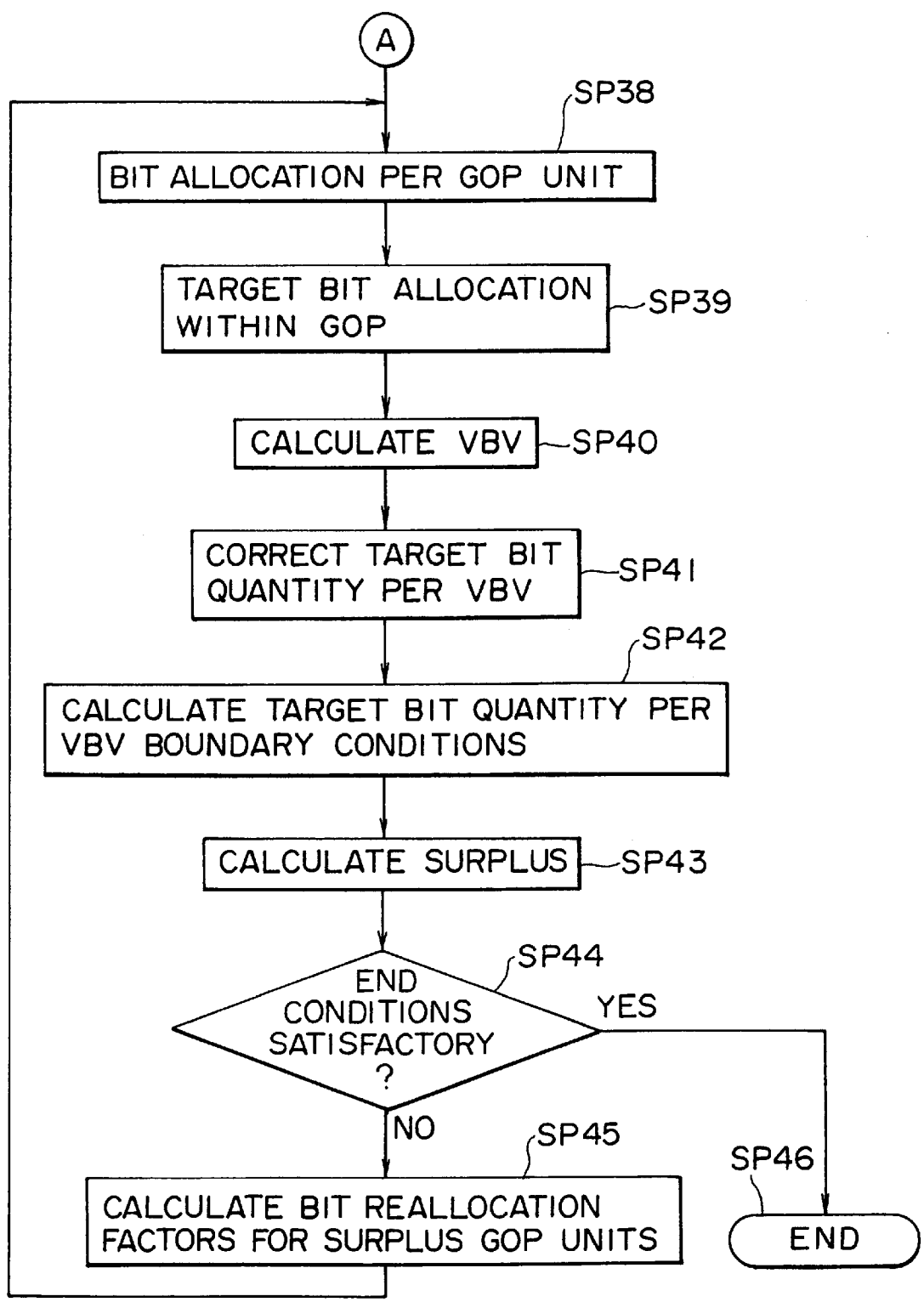

FIG. 10

| NO. 1 WEIGHTED VALUE TABLE | |
|---|---|
| ENCODE UNIT NO. | WEIGHTED QUANTITY |
| 1 | 120 |
| 2 | 100 |
| 3 | 90 |
| 4 | 100 |
| 5 | 100 |
| 6 | 100 |
| ⋮ | ⋮ |

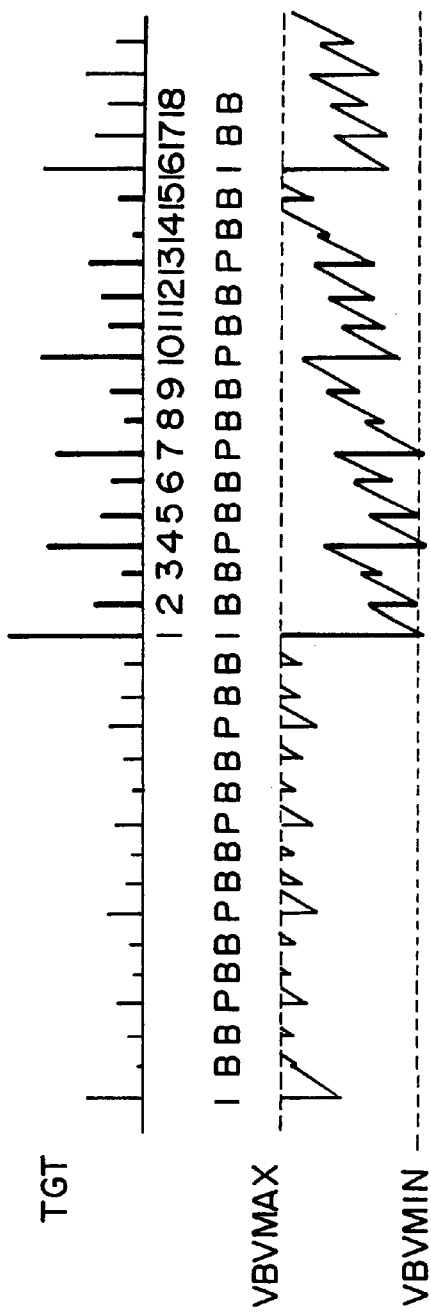
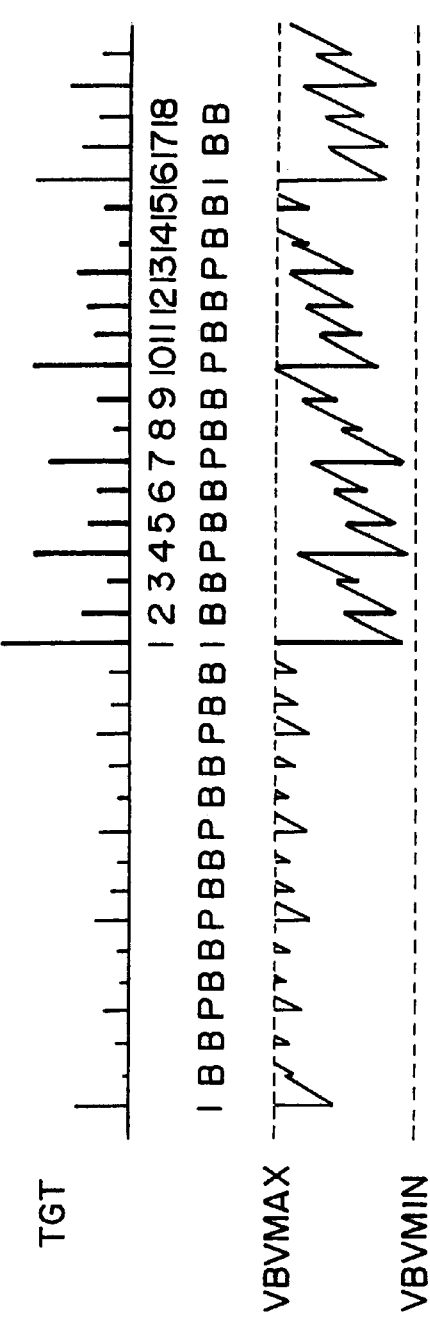
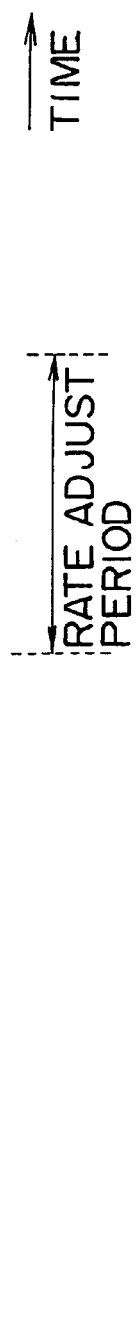
FIG. 16A
FIG. 16B
FIG. 16C
FIG. 16D

FIG. 17A1
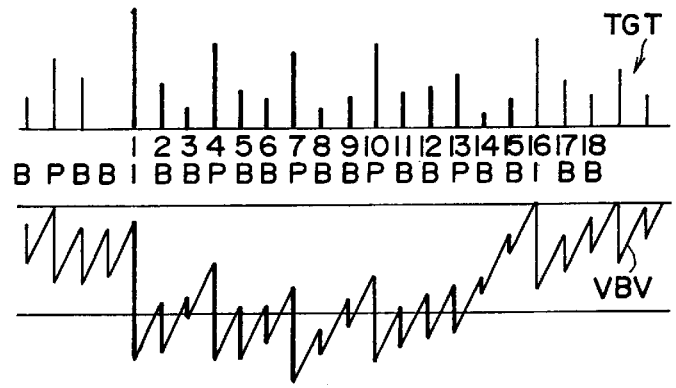
FIG. 17A2
FIG. 17B1
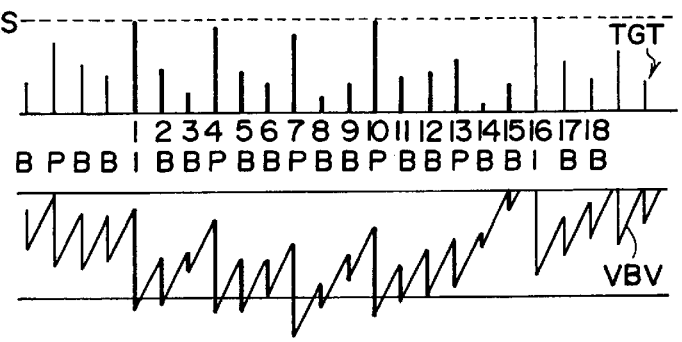
FIG. 17B2
FIG. 17C1
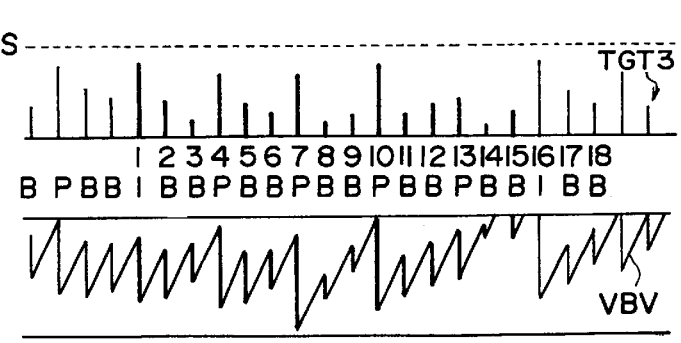
FIG. 17C2

FIG. 18A1
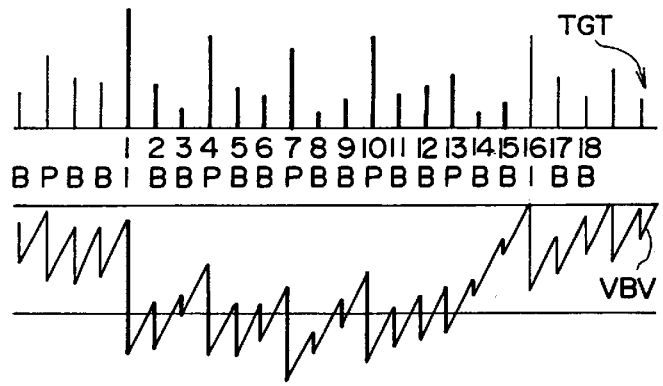
1 2 3 4 5 6 7 8 9 10 11 12 13 14 15 16 17 18
B P B B I B B P B B P B B P B B I B B
FIG. 18A2
FIG. 18B1
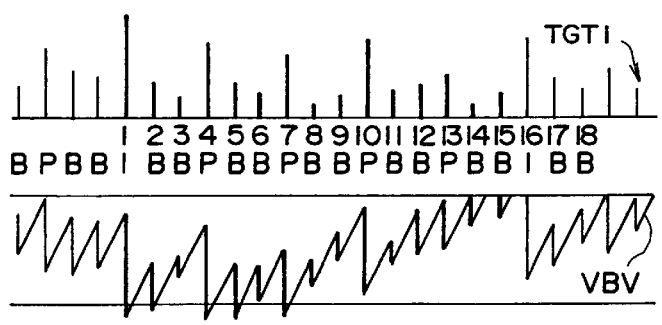
1 2 3 4 5 6 7 8 9 10 11 12 13 14 15 16 17 18
B P B B I B B P B B P B B P B B I B B
FIG. 18B2
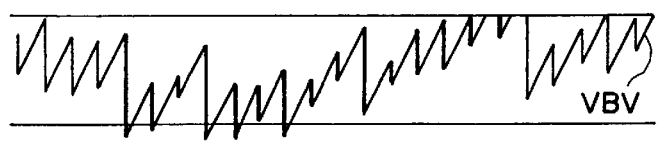
FIG. 18C1
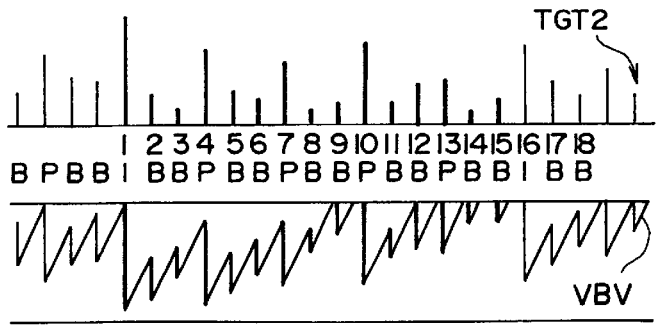
1 2 3 4 5 6 7 8 9 10 11 12 13 14 15 16 17 18
B P B B I B B P B B P B B P B B I B B
FIG. 18C2
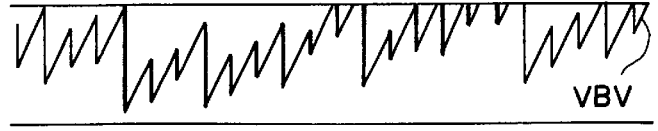

DATA COMPRESSION DEVICE THAT SWITCHES BETWEEN INTRA-FRAME CODING AND INTER-FRAME CODING

BACKGROUND OF THE INVENTION

1. Field of the Invention

The present invention relates to a data compression device used for instance, when compressing data by means of the MPEG (Moving Picture Experts Group) technique for an authoring device. In this invention, when setting a target quantity of data for data compression based on the data quantity detected by the previous data compression process, the target data quantity are utilized in units of Group of Picture blocks and data is allotted to each frame in optimal amounts to achieve high image quality data compression of limited quantities of video data by correcting the structure of each Group of Pictures.

2. Description of Related Art

Currently, when a package media such as an optical disk has been fabricated, the various data for this optical disk such as audio data and video data compressed by techniques such as MPEG (Moving Picture Experts Group) are then multiplexed processed for recording onto various media.

In an authoring device implementing this kind of process, data compression of the video and audio data is performed in order to reduce the data bit quantity to an amount that can be recorded on the media and store the audio and video data within the allotted bit amount. Video data is allotted in a certain amount of bits to each frame according to the bit quantity yielded from the video data compressed under these set conditions.

In other words, when video data is compressed by the MPEG technique, the bit quantity after compression fluctuates greatly according to the material. The bit quantity after condensation also varies according to the coding within the frame and the coding process between frames.

In a data compression process for instance that maintains set data compression conditions, the authoring mechanism compresses the video data for recording onto an optical disk and detects sequentially, in frame units the bit quantity of compressed video data. Further, the data compression conditions are altered based on this detected bit quantity, causing the bit quantity assigned to the video data, to be allocated to individual frames according to the data quantity generated in the data compression process so that video data is suitably compressed.

Thus, the authoring device can efficiently record video data and audio data on a media with limited capacity, such as an optical disk.

However when setting data compression conditions based on bit quantities generated from the coding process used above, in actual operation, the target bit quantity for data compression is set for each frame and the coding conditions also set by the authoring mechanism. The process of setting the target data quantity is implemented by assigning allowable quantities of data to each frame according to the bit quantities generated by the coding process. Further, these frames which are set with the target data are corrected by the maximum transfer speed allowed by the optical disk. Finally, the video data is coded in sequence in compliance with the target bit quantity which has now been corrected according to these various conditions.

In the conventional authoring device using this kind of correction, the assigned target bit data sometimes could not ultimately be allocated correctly to the I picture, P picture, and B picture due to the difficulty involved in the process. So that assigning data in limited amounts and performing high quality video data compression was troublesome and difficult.

SUMMARY OF THE INVENTION

In view of the above problems it is therefore an object of the present invention to provide a data compression device allocating limit quantities of data in suitable amounts and processing high image quality video data into compressed data.

In order to resolve the above mentioned problems, this invention sets the intra-frame coding and inter-frame coding in one block units, allocates the data quantity assigned to the entire video data into separate blocks based on the data quantity processing results and after setting the target data quantity for each block, allocates the target bit quantity for each frame so that the target data quantity in each block at that time is corrected according to the individual block structure.

After allocating the target bit quantity to each frame, if the target bit quantity is then corrected according to the structure of the individual block, the data quantity rate from the previous process can be maintained and the target bit quantity then set. This correction also allows assigning a suitable bit quantity in each GOP (group of pictures).

BRIEF DESCRIPTION OF THE DRAWINGS

FIG. 6A and FIG. 6B are concept views of the GOP structure.

FIGS. 8A through 8C are concept views all illustrating the degree of difficulty.

FIG. 9 is a flow chart showing the process continuing from FIG. 1.

FIG. 10 is a weighted value table.

FIGS. 16A through 16D are characteristic curve graphs illustrating target bit correction by VBV.

FIGS. 17A1 through 17C2 are characteristic curve graphs illustrating target bit correction by controlling bit quantity per unit.

FIGS. 18A1 through 18C2 are characteristic curve graphs illustrating target bit correction according to the GOP structure.

DETAILED DESCRIPTION OF THE PREFERRED EMBODIMENTS

Hereafter the embodiment of this invention is described while referring to the accompanying drawings.

(1) Overall Structure

Figure 1:
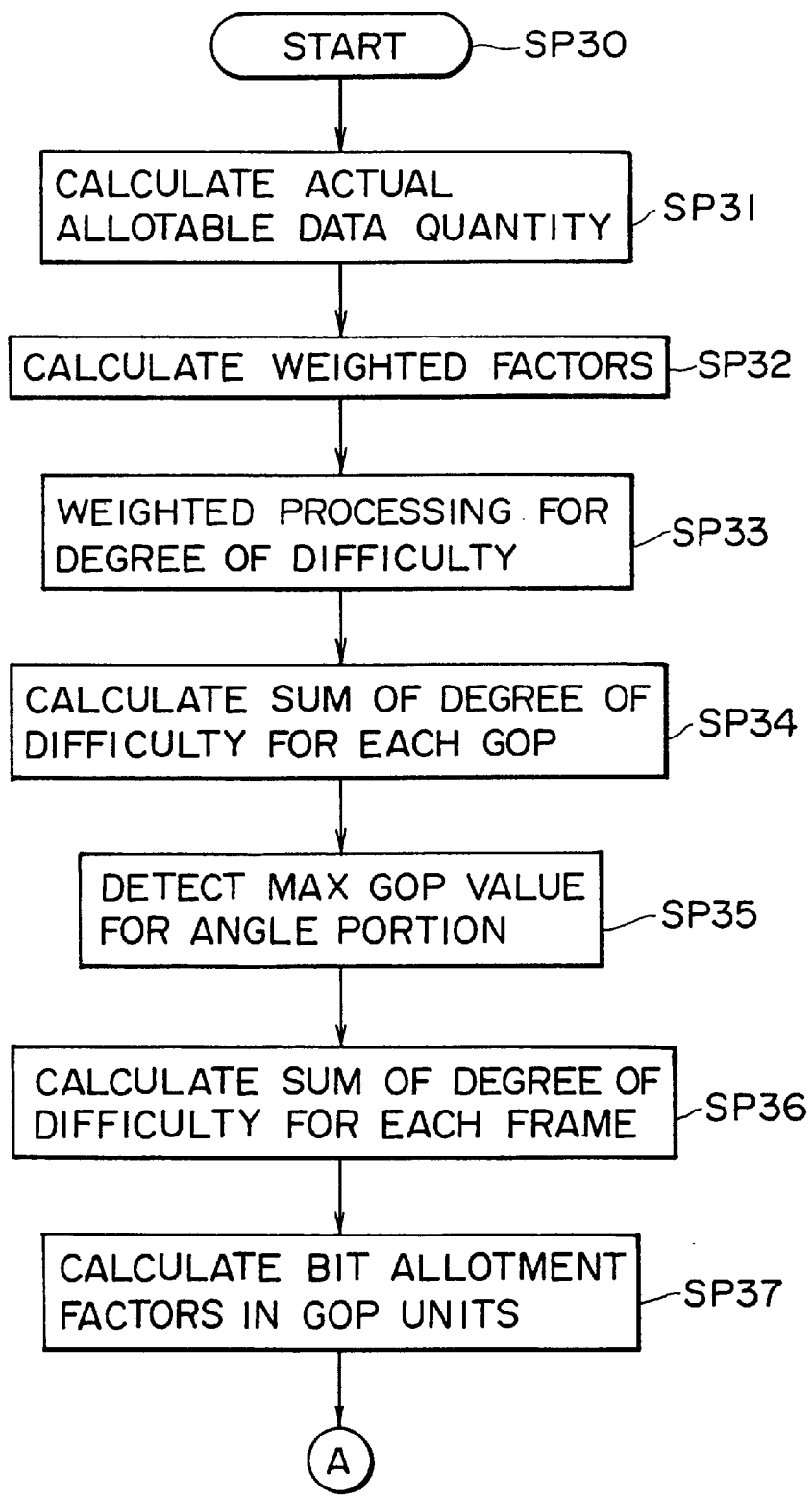
FIG. 1 is a flow chart showing the processing procedure for bit allocation in the main controller for the authoring device of the embodiment of this invention.
Figure 2:
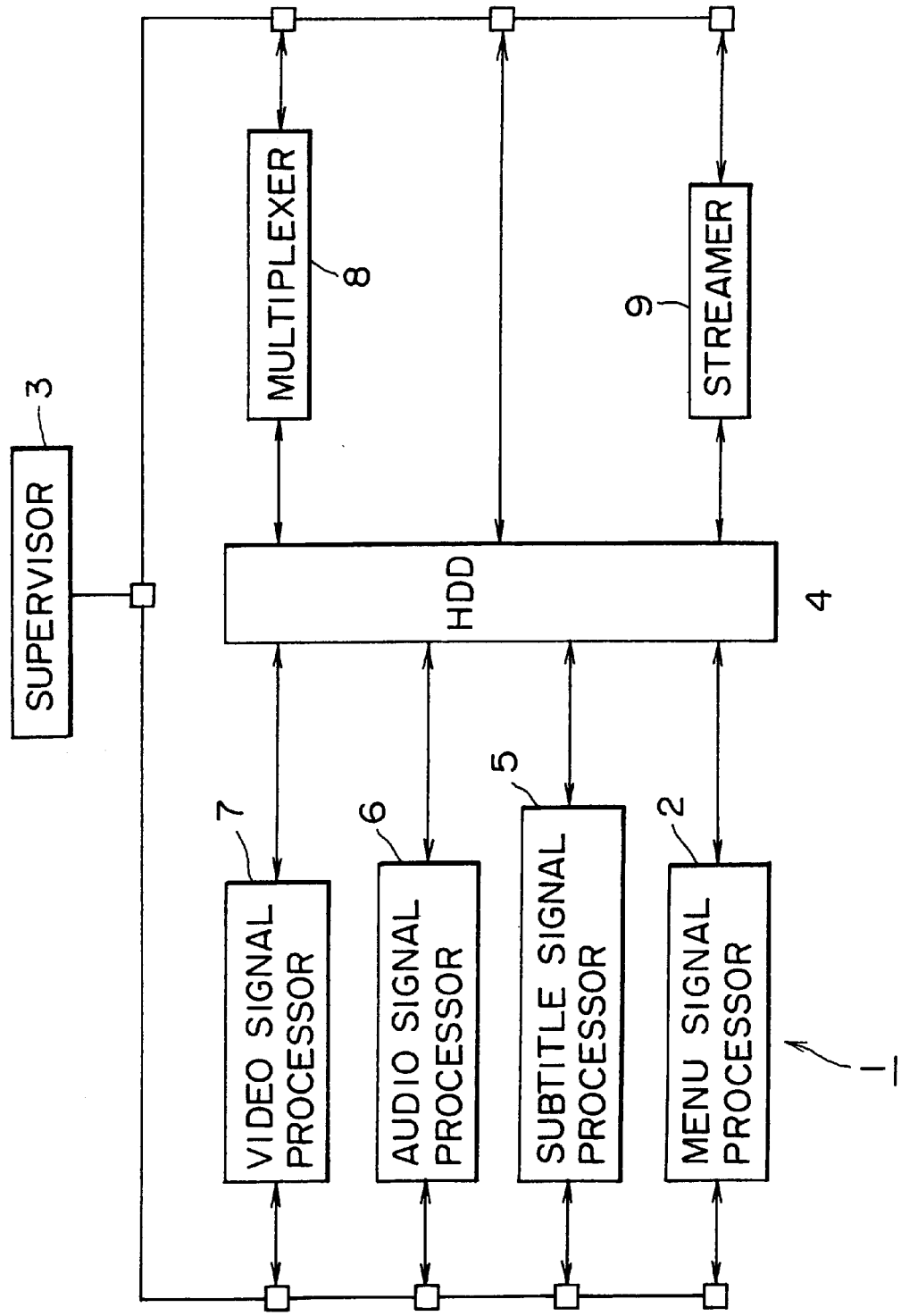
FIG. 2 is a block diagram showing the overall structure of the authoring device of FIG. 1.

FIG. 2 is a block diagram showing the authoring device relating to the embodiment of this invention. In an authoring device 1, connections are made to the devices by means of a network and multiplex streams are generated for recording onto an optical disk.

In other words, operation of a menu signal processor 2 in the authoring device 1 is triggered by the supervisor 3. Coding is performed of the video data on the menu screen supplied by a device such as a video tape recorder (not shown in drawing). The video data thus obtained is recorded onto a hard disk (HDD) 4. A title signal processor 5 is controlled by being switched by the supervisor 3 just as with the menu signal processor 2 and coding is performed on video data of, for instance a title supplied from a video tape recorder (not shown in drawing) and this video data then recorded onto the hard disk (HDD) 4.

An audio signal processor 6 is controlled by the-supervisor 3 just as the other processors are. Coding is performed of the audio data supplied by a tape recorder (not shown in drawing) and recorded onto a hard disk (HDD) 4. A video signal processor 7 operated by the supervisor 3 codes the video data which are the main recording contents for recording onto the optical disk. These contents are then recorded onto the hard disk (HDD) 4.

A multiplexer 8 controlled by the supervisor 3 makes a multiplex stream file from the encoded video data recorded onto the hard disk 4.

A streamer 9 read outs the video data from the hard disk 4 in sequence and generates a serial data string in compliance with the multiplex stream file made by the multiplexer 8, and a multiplex stream is thus made. This streamer 9 also records this multiplex stream onto a recording medium such as magnetic tape. Thus in the authoring device 1 this recording media is supplied to a cutting mechanism and an optical disk can then be made.

The hard disk 4 is comprised of a disk array and video data compressed such as by the video signal processor 7 is recorded and triggered by a request such as from the multiplexer 8 and the stored data then output.

The supervisor 3 is configured for overall control of this authoring mechanism 1 and controls operation of the various devices according to conditions set by the operator. In other words, the supervisor 3 notifies each unit of the required processing by means of an editing list in a location such as the video signal processor 7 made by the operator. This supervisor 3 also calculates the data quantity assigned to the video data or audio data by means of the available recording storage capacity on the optical disk. Each processor (device) is then notified of this calculated data quantity by means of the encoding file.

The supervisor 3 also notifies the video signal processor 7 of video signals, with the chapter time information set by the operator. This chapter is a frame coded by intra-frame coding. In an optical disk mechanism of this type, the chapter is used as the target for checking recording contents by means of track jump.

The supervisor 3 also notifies the video signal processor 7 of video signal items such as the GOP (Group of Pictures) maximum number of display fields (since the NTSC system is limited to 36 fields and the PAL system to 30 fields, in the actual embodiment the NTSC system is set to 15 frames and the PAL system to 12 frames) and the code processing layout for each GOP, etc. The supervisor 3 also notifies the video signal processor 7 of multiangle processing items. The term "multiangle" as used here, refers to a process in which time-multiplexing of a plurality of video materials is performed and the results then recorded onto a disk so that for instance a railroad train can be seen from different filming perspectives according to the selection by the user.

The supervisor 3 also notifies the video signal processor 7 by means of a coding file, of other information needed for coding along with the above information.

Figure 3:
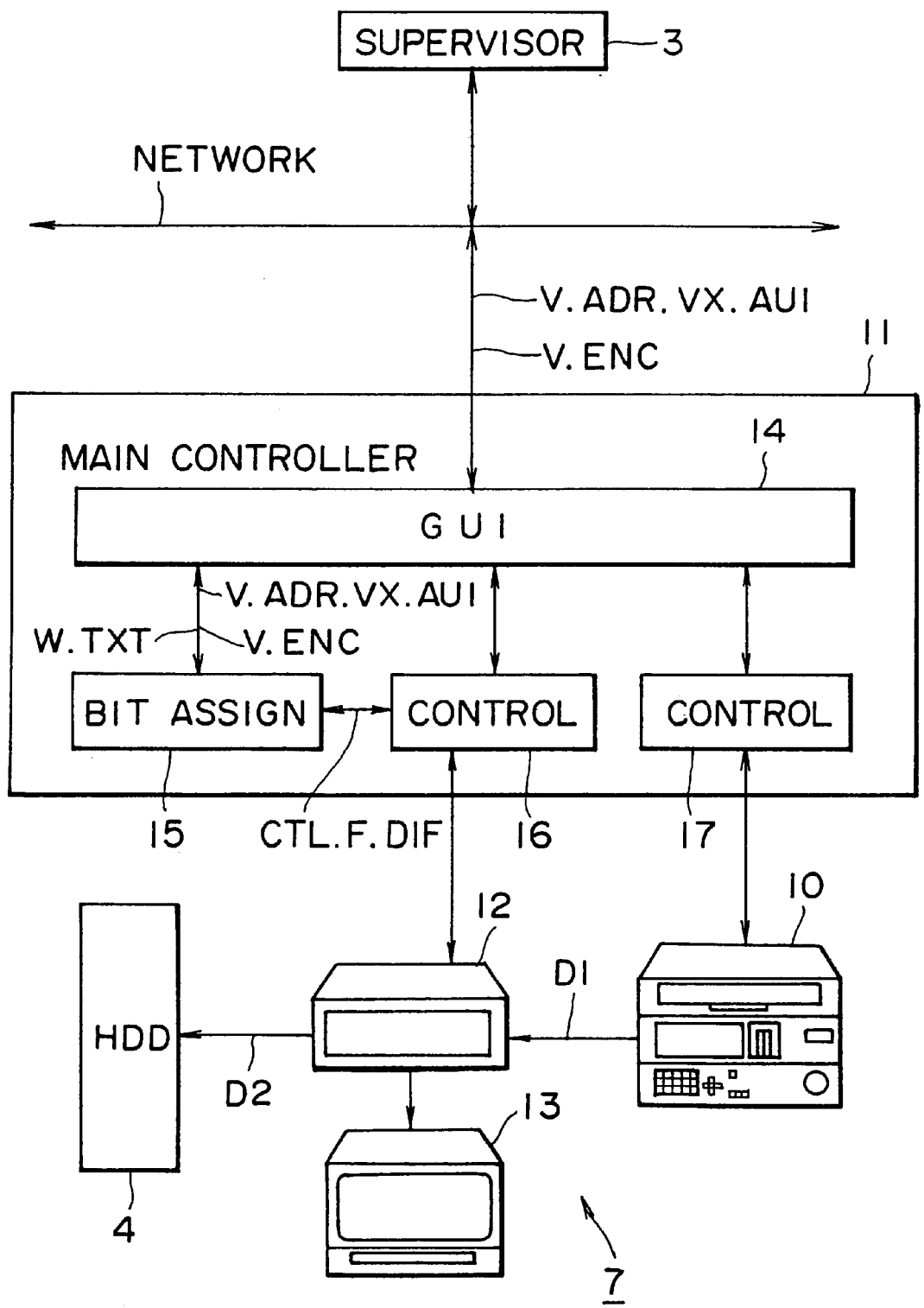
FIG. 3 is a block diagram showing the video signal processor of FIG. 2.

FIG. 3 is a block diagram showing details of the video signal processor 7. In this video signal processor 7, a video collector 10 plays back or reproduces magnetic tape according to an editing list received from the supervisor 3 by way of a main controller 17 and then outputs the video data D1.

An encoder 12 switches the operation according to conditions reported from the supervisor 3 by way of the main controller 11 and compresses the video data output from the video recorder 10. During this time, the encoder 12 compresses the video data D1 by means of the MPEG method. The code conditions for the data compression are controlled by the main controller 11. The bit quantity generated by this data compression is regulated by the main controller 11.

The encoder 12 also informs the main controller 11 of code processing results during the above coding and the main controller 11 therefore finds the data quantity per frame unit in each frame as generated by the data compression. The encoder 12 also based on notification to the main controller 11 of processing results from data compression of the video data D1 per the existing condition settings, records the data compressed video data D2 onto the hard disk 4 in the final data compression process and then notifies the main controller 11 of the address and data quantities that were recorded.

A monitor 13 is configured to be able to monitor the compressed video data D2 from the encoder 12. This means that the video signal processor 7 can check the data compression processing results as needed with the monitor 13. This can be called a kind of preview. Based on these preview results, the main controller 11 is operated and fine changes can be made in the details of the coding.

The main controller 11 controls the overall operation of the video signal processor 7 by means of data exchange with the supervisor 3 by way of the network. In other words, the main controller 11, along with being controlled from the supervisor 3 by graphical user interface control (GUI) 14, is also subject to operator control. A bit assign program 15, and control programs 16, 17 which are operated by this graphical user interface 14, have control of the operation of the encoder 12 and the video recorder 10.

The main controller 11 thus performs the coding according to the conditions reported from the supervisor 3 and reports the processing results to the supervisor 3. Further, the settings made by the operator are received by way of the graphical user interface 14 and fine changes can then be made in fine details of the coding.

In other words, the control program 1 controls the operation of the video tape recorder 10 according to the conditions reported in the edit list by the supervisor 3 and the target portion for editing is then played back.

Further, the bit assign program 15 is notified in the same manner by the supervisor 3 and the coding conditions are determined for each frame unit according to the coded file V. ENC. Due to these conditions, the control program 16 is informed of the control data in file format (CTL.F). The bit assign program 15 at this time sets the bit allocation in the coding process and these condition settings are further changed in response to input from the operator. Also, when the bit assign program 15 records the compressed video data D2 onto the hard disk 4, the supervisor 3 is notified of the address data V. ADR of the hard disk 4 along with the necessary data (data forming the data quantity, etc.) VX. AUI for multiplex processing in the multiplexer 8.

A control program 16 performs coding control of the encoder 12 according to the control file CTL. F from the bit assign program 15. Also, data for the degree of difficulty required for each coding process in frame units is sent to the bit assign program 15 and when the video data D2 is recorded onto the hard disk 4, the bit assign program is notified of the necessary data VX.AUI for multiplex processing and the address data V. ADR of the hard disk.

(2) Main controller 11 processing

Figure 4:
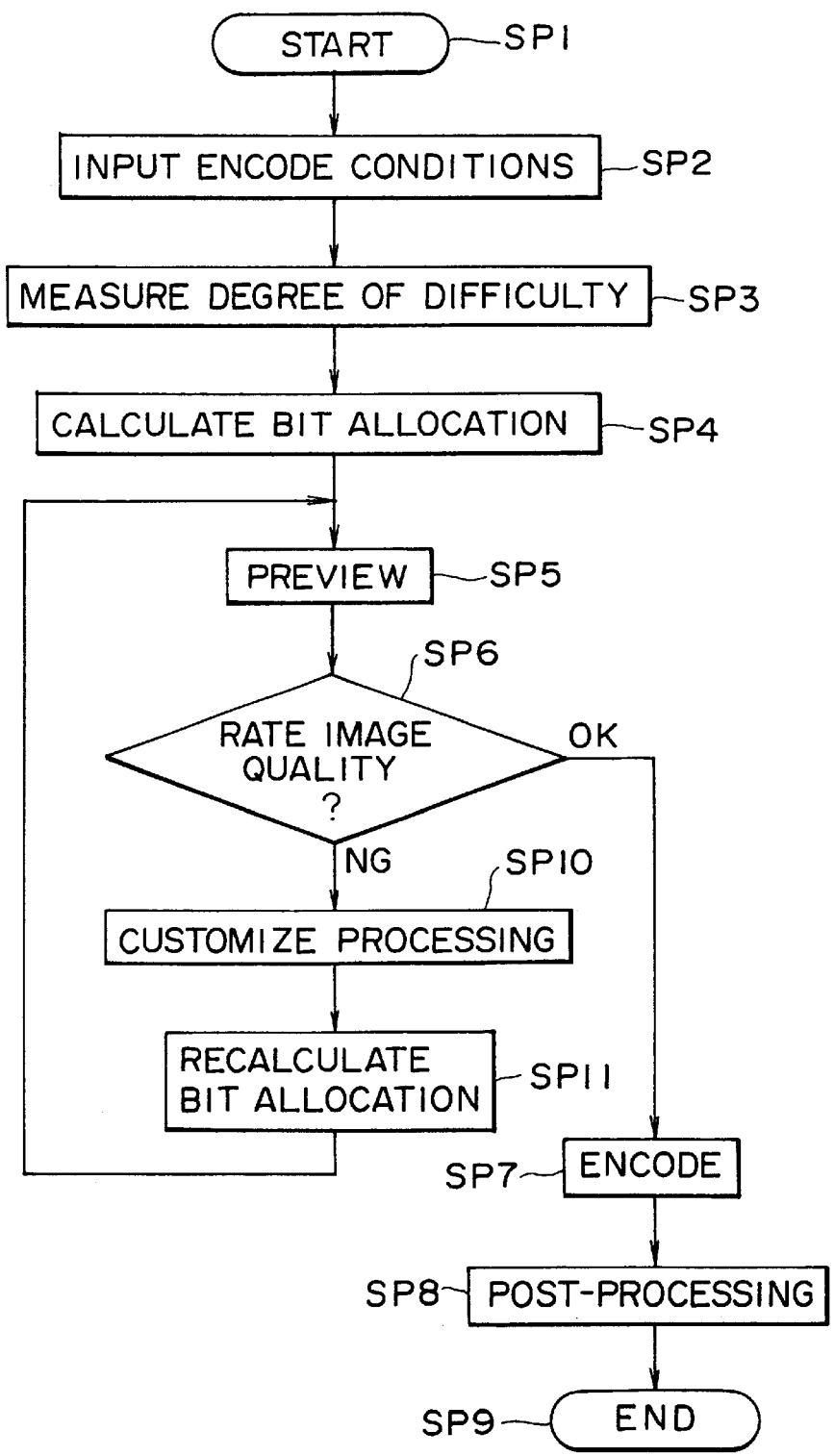
FIG. 4 is a flow chart showing the process procedure in the main controller for the video signal processing device of FIG. 3.

A flowchart for the process procedure in the main controller 11 is shown in FIG. 4. When the main controller is instructed to start the process by the supervisor 3, the bit assign program 15, the controller program 16, 17 are started by the graphical user interface 14 and the process procedure is implemented.

More specifically, when the main controller 11 is instructed to start processing, operation moves from step SP1 to step SP2 and coding conditions are acquired from the supervisor 3. Next the main controller 11 shifts the operation to step SP3 and the degree of difficulty in the coding process is assessed.

The degree of difficulty DIF as used here, is the data quantity after coding when the coding of the video data was performed in the fixed quantized step. In other words, at a turbulent movement portion in the coding process between frames, the estimated error from the pre-measured frame become large so a large data quantity is needed at that portion in order to limit the deterioration in image quality. Also, in the coding process within the frame, when there are many high frequency components, discrete variable cosine processing is performed and coefficient data to a higher power is generated so that a large data quantity is needed to reduce the deterioration in image quality. If video data is coded by means of fixed quantized steps, a large quantity of data will be detected in the portion requiring a large data quantity thus allowing the degree of difficulty DIF needed for the coding to be measured.

The main controller 11 controls operation of the encoder 12 according to this detection principle so that excluding the code processing at the point of the fixed quantized step above, code processing of video data which is the object of the code processing is performed at nearly the same conditions as the actual code processing and at the instruction from the encoder 12, the degree of difficulty DIF is measured for each frame.

The main controller 11 next implements bit allocation calculation in step S4. The bit quantity assigned to each frame is calculated by means of this degree of difficulty DIF. Thus the main controller 11 sets the data compression conditions according to using the data quantity from the process results as a reference.

Next, the main controller 11 shifts to step SP5 and implements the preview processing. The preview processing not only plays back the video data D1 from the tape recorder 10 of the target coding item in response to the input from the operator but also performs code processing of this reproduced video data D1 under coding conditions set in step SP4 and displays the video data D2 obtained from these results onto the monitor 13.

The main controller 11 continues by means of the preview process to step SP6, receives the operator decision on screen quality and when the operator sends an instruction to the encoder approving the screen quality, then the operation proceeds to step SP7. Here, the controller 11 issues the video data D1 for processing, in sequence from the video tape recorder 10 and performs code processing of this video data D1 according to conditions set in step SP4. The operation then proceeds to step SP7 and after the supervisor 3 is notified of the results of the coding, the operation proceeds to step SP9 and the process is now complete.

Here if the operator is not satisfied with image quality and selects the customize process, then the main controller 11 shifts from step SP6 to SP10 and implements customizing. In this customizing process, coding conditions for a local segment are changed in response to the operator instruction so that localized changes are made in the image quality.

In this process, the main controller 11 makes a weighted file for correcting the degree of difficulty DIF in response to the operator's instructions. The main controller 11 then shifts to step SP11 and by implementing a process identical to step SP4 in compliance with the weighted file that was made. starts bit reallocation and then returns to step SP5.

Here, the main controller 11, along with setting coding conditions in the encoder 12 based on the degree of difficulty DIF, makes sequential condition changes in response to operator instructions, and finally code processing of the video data D1 is performed which satisfies the conditions set by the operator.

Figure 5:
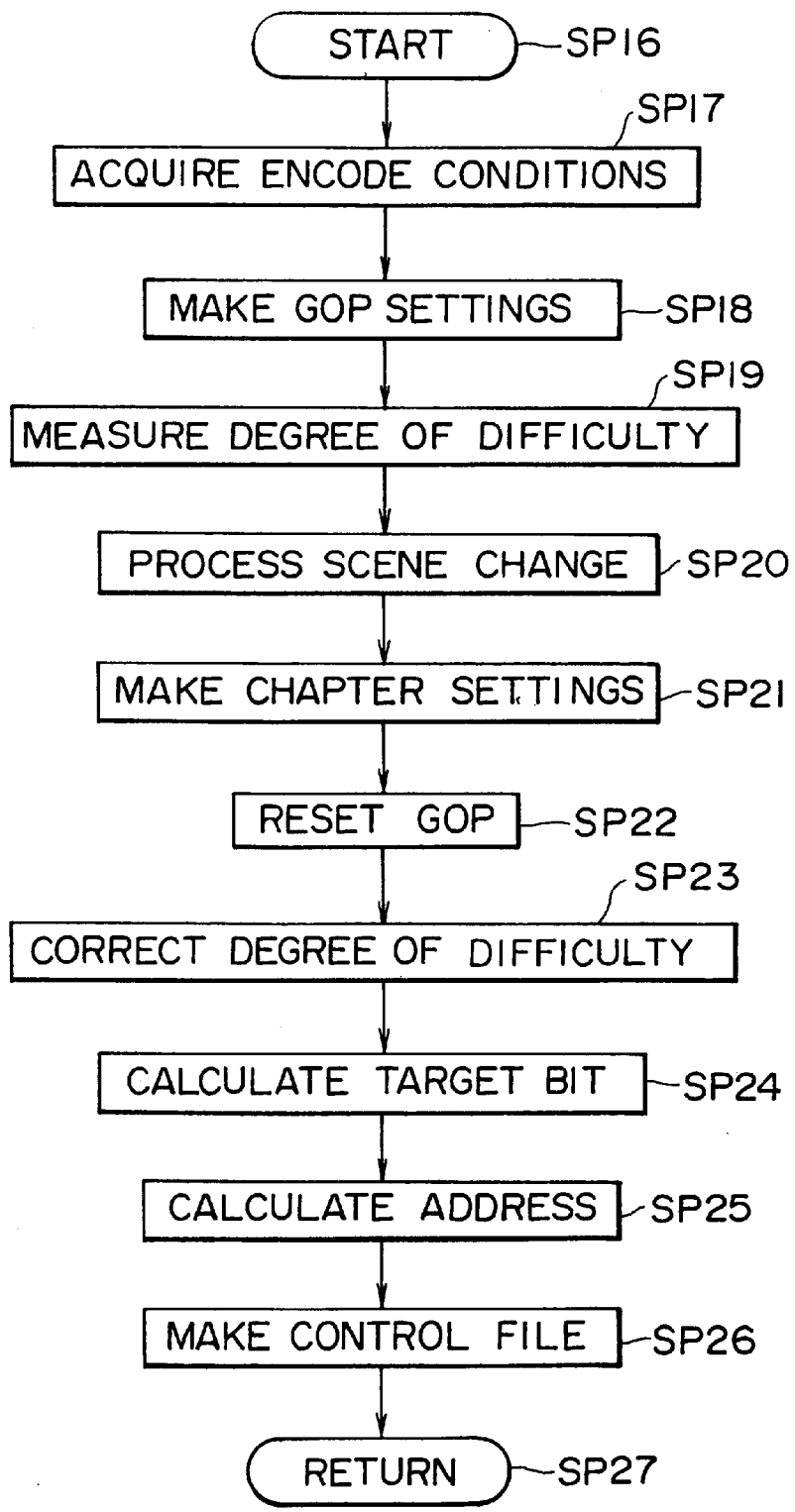
FIG. 5 is a flow chart showing details of the degree of difficulty in the measuring process.

FIG. 5 is flowchart showing details of step SP3 and SP4 in FIG. 4. The main controller performs code processing of the video data D1 that is nearly the same as the actual code processing except for code processing of the fixed quantized step and the degree of difficulty for each frame is measured. A control file CTL. F is then made for the encoder 12 using the degree of difficulty that was measured.

In other words, the main controller 11 shifts from step SP16 to step SP17 and after acquisition of coding conditions set by the supervisor 3, the operation shifts to step SP18. Here, the main controller 11 implements the settings for GOP. As shown in FIG. 6, the main controller 11 sequentially forms the target video data D1 into blocks (when using the NTSC method) so that a GOP is formed in 15 frames. The main controller 11 segments the continuous frames from the lead side in units of three frames each with the frame immediately prior to the first segment set as the I picture, and the frame right before the other segment being set as the P picture, with the remaining picture set as the B picture (FIGS. 6A and 6B) The symbols I, P, B shown in FIG. 6 respectively represent the I picture, P picture and B picture.

The main controller 11 next shifts to step S19 and measures the degree of difficulty DIF. The main controller 11 controls the video recorder 10 operation and sequentially plays the target coding of the video data D1 according to this degree of difficulty DIF. The encoder 12 is further instructed on the coding and code processing is then performed in step SP18 by setting this played video data D1 according to the picture settings. The main controller 11 then acquires the data quantity generated by the coding, from each frame, from the encoder 12. The main controller 11 at this time controls the operation of the encoder 12 to perform coding according to the fixed quantized step used for measuring the degree of difficulty. The acquired data quantity is further formed as a degree of difficulty DIF file and stored.

Next, the main controller 11 shifts to step S20 and implements scene change processing. In other words, when measuring the degree of difficulty DIF, the main controller 11 acquires the DC level for the luminance (level) per the I picture and P picture and acquires summed differential data from the encoder 12 when performing motion compensation. The scene change and flash frame are then detected by means of these DC levels and summed differential data. The "scene change" referred to here, is characterized by an unnatural deterioration in image quality when the scene has been changed and performing code processing by means of MPEG with the scene change frame set in the P picture. In other words, when code processing with MPEC, setting this scene change frame in the I picture allows high quality code processing of the video data.

The flash frames can be inserted in a gap for maintaining continuity in surrounding frames, in for instance photographic filming such as when photo flash occurs. When performing code processing by means of MPEG, the next frame of the flash is set in the I picture to allow high quality code processing of the video data.

The main controller 11 detects scene changes and flash frames from the above items and resets the scene change frame and frame right after the flash, into the I picture.

Figures 7A, 7B:
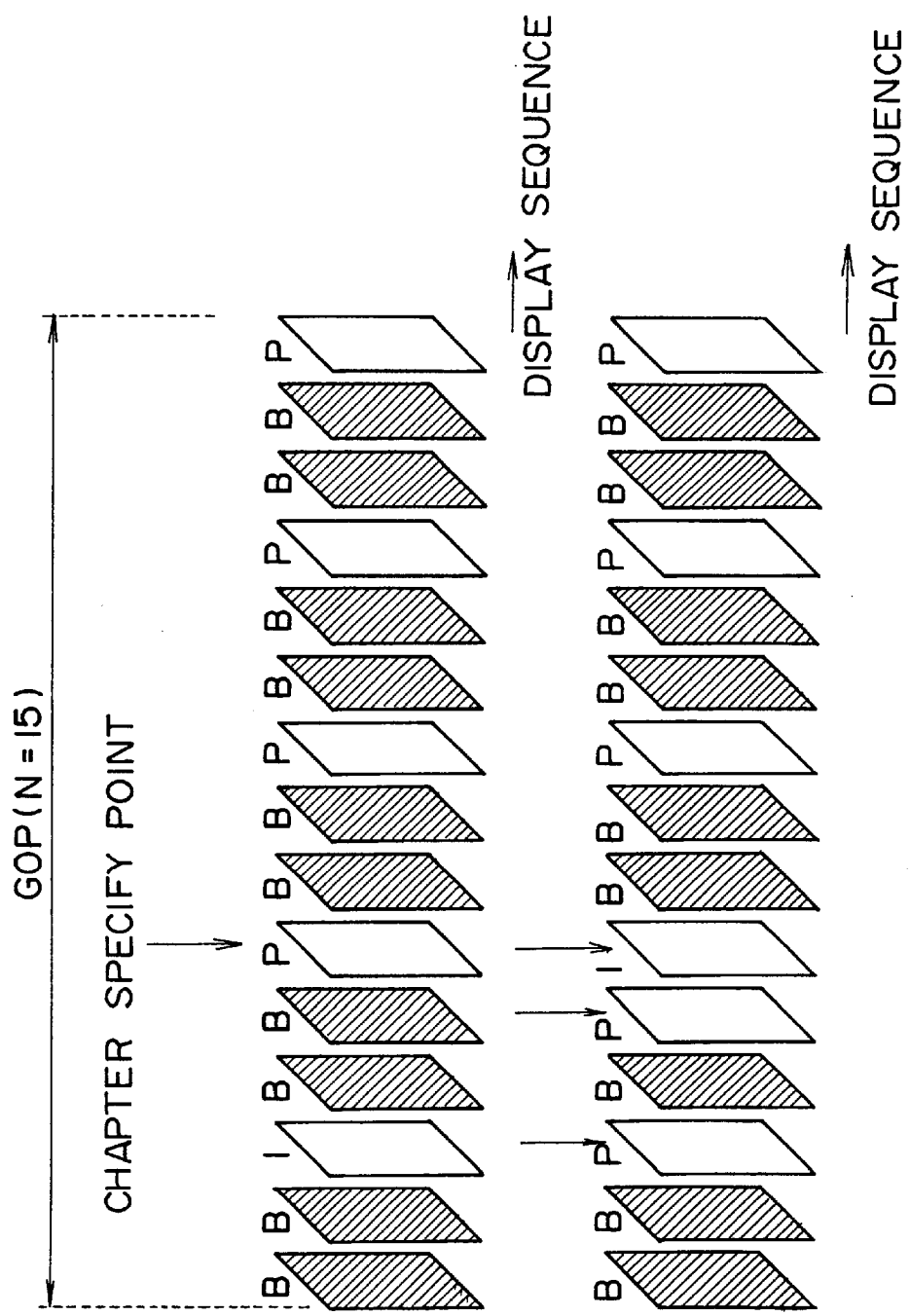
FIGS. 7A and 7B are concept views both illustrating the chapter settings.

Next, the main controller 11 shifts to step SP21 and implements the chapter settings. As FIG. 7 shows in contrast to FIG. 6, the main controller 11 complies with instructions from the operator by means of the supervisor 3 and for instance the No. 6 frame of the specified GOP is designated in the chapter frame, changes the I picture within this GOP, into this chapter frame (FIGS. 7A and 7B). Further, when necessary, the frame immediately prior to the chapter is set in the P picture, and the B picture and P picture are set so that the frames anticipated to be before and behind the chapter do not overlap. In these chapter settings, the main controller 11 next implements the I picture settings involving the multiangle.

The controller 11 next shifts to step SP22 and implements and resets the GOP. Here, the main controller 11 by means of the chapter settings detects locations where 1 GOP exceeds 15 frames and sets the P picture in the I picture at these locations. This serves to prevent GOP from occurring that exceed 15 frames anywhere in the target data.

When these picture settings are complete, the main controller 11 shifts to step SP23 and implements corrections for the degree of difficulty DIF that was measured. In other words, in this correction the I picture settings are corrected by means of the scene change and the main controller 11 utilizes the frame data quantity in proximity to the corrected frame for interpolation calculation so that the degree-of difficulty DIF versus the corrected frame settings can be calculated. In the authoring device 1, this process allows measurement of the degree of difficulty and resetting of the picture to be simultaneously performed in parallel with each other and thus shortens the time needed for processing.

The main controller 11 next shifts to step SP24 and calculates the coding target bit quantity by the degree of difficulty that was detected. In other words, as shown in FIG. 8, in portions where the degree of difficulty DIF is large, a large bit quantity can be allocated for code processing and deterioration in image quality can be prevented (FIG. 8A). In portions where the degree of difficulty DIF is small, coding is performed without allocating such a large bit quantity and deterioration in image quality can be prevented. Thus, a target bit quantity is set for coding (FIG. 8B) by the main controller 11 just as when allocating a large bit quantity for portions with a large degree of difficulty. This setting process thus allows the video data D2 to be output from the encoder 12 at a transfer speed according to the degree of difficulty DIF (FIG. 8C).

At this time, the main controller 11 calculates the target bit quantity according to conditions previously set by the operator by way of the supervisor 3 for play conditions and multiangle, by implementing the process procedure described later on. This procedure allows various conditions to be added and an allowable bit quantity recorded onto the optical disk while allocated in correct amounts to the video data.

When the bit allocation has now been set as described above, the main controller shifts to step SP25 and calculates an address for the hard disk 4 that matches this bit allocation. Operation then shifts to step SP26 where a control file is made for listing in sequence this calculated address and the target bit quantity. The control program 16 in compliance with this target bit quantity, alters the quantized step used in the measurement of the degree of difficulty DIF and controls the encoder 12 operation so that the video data D2 data quantity output from the encoder 12 is kept within the target bit quantity. Also at this time, the encoder 12 makes the time code appended to the video data D1 match the address of the control file and the quantized step is then changed.

When the control file is made in this way, the main controller shifts to step SP27 and the procedure ends.

(3) Bit allocation processing

FIGS. 1 through 9 are flowcharts showing the bit allocation process per step SP24 of FIG. 5. The main controller shifts operation from step SP30 to step SP31, implements processing for the next formula and calculates the total supply bytes that can actually be allotted to the video data.

$$\text{SUPPLY BYTE} = \text{USE BYTES} - \text{TOTAL HEADER} \quad (1)$$

The USE BYTES in this formula is the data quantity allocable to the video data D1 as instructed from the supervisor 3, and corresponds to the data quantity from the encoding results recorded on the hard disk 4. The TOTAL HEADER is the data quantity of appended data such as the header, calculated by means of the total figure for the GOP.

Accordingly, the main controller 11 can calculate the data quantity allocable to the video data by implementing the calculation in this Formula (1), exclusive of control codes such as the header.

Next, the controller 11 shifts to step SP32 and implements calculation of weighted factors. This embodiment sets the target bit quantity according to the degree of difficulty DIF. The image quality is improved by applying weighted factors to the degree of difficulty DIF by means of the DC level of each frame, code processing type (difference versus I, P, B pictures). The main controller 11 therefore can calculate weighted values according to the DC level detected in each picture and the picture settings described above.

The main controller 11 next shifts to step SP33 and performs weighted processing utilizing the weighted factors calculated from the degree of difficulty DIF that was measured. In this embodiment when setting coding conditions per the supervisor 3, the extent of image quality desired for each encoder unit can be set and the supervisor 3 forms the No.1 weighted table shown in FIG. 10 according to these settings.

The weighted quantities listed in this table are default values of 100 and this value 100 indicates standard image quality. The target bit quantity increases as this value increases, improving the image quality. The encoder unit here, is blocks of video data D1 comprised of a plurality of GOP and in this embodiment these are continuously codeable blocks. In other words, the encode unit is for instance applicable to continuously played blocks which were output from the video recorder 10.

In this step S33, when the main controller 11 performs weighted processing of each frame for the degree of difficulty DIF, the degree of difficulty DIF is multiplied by the weighted values in the No. 1 weighted value table and then divided by the value 100.

Next, the main controller proceeds to step SP34 and calculates the sum GOP DIF of the degree of difficulty for each GOP.

The main controller then proceeds to step SP35 and sequentially detects the maximum value of the degree of difficulty DIF between corresponding GOP for seamless angles among the angle blocks for the encode unit. This allows the main controller 11 to set equal data quantities generated in GOP units for the seamless angles among the block angles.

Figure 11A:
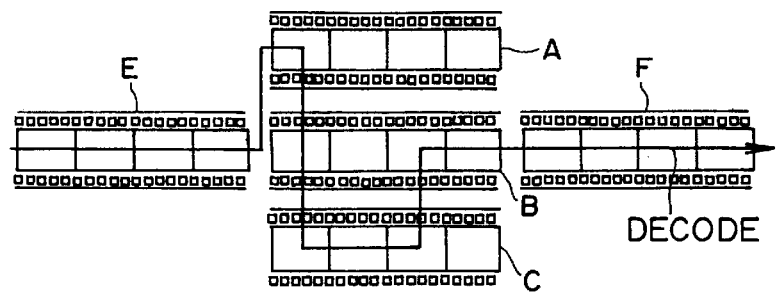
FIGS. 11A through 11E are all concept views for illustrating seamless angles.

Here, the angle block is a non-seamless angle at decode switching between a plurality of encode units at the pause of consecutive image play displayed such as at black screens, and a seamless angle found during consecutive image play. Consequently as shown in FIG. 11, the encode units A, B and C which comprise the seamless angle are consecutively decoded with the encode units E and F located in front and behind. And even if the decode is switched with the encode units A, B and C, a consecutive decode can be obtained (FIG. 11A).

Figure 11B:
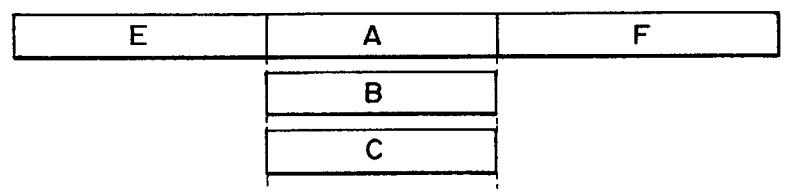
Figure 11C:
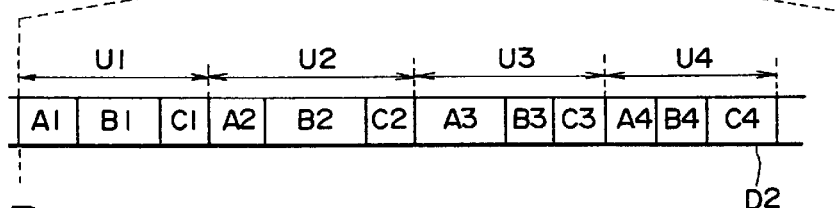
Figure 11D:
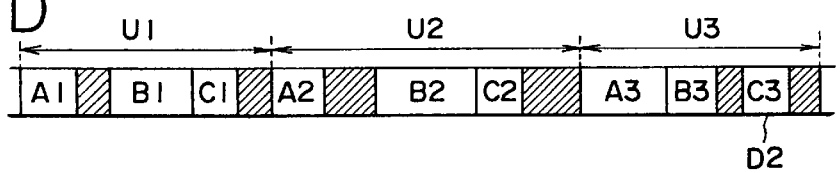

In this case since the time needed for seek must be shortened and video data must be consecutively supplied to the decoder from the optical disk, the encoder units A, B and C comprising the seamless angle are recorded onto the optical disk by time-multiplexing. In other words, the encode units A, B and C are divided up into minute blocks of GOP units, and these minute blocks comprise the interleaved multiplex stream D3 (FIGS. 11B and 11C). These minute blocks also set an equal number of frames between the A, B and C encode units and the I, P, B picture array comprising the GOP must also be set equal.

However when forming blocks in this manner, data for the encode unit within the A1, B1, C1 blocks and A2, B2, C2 blocks tends to have large discrepancies in data quantity (FIG. 11C) so that when forming a multiplexed stream, data distribution is difficult by interleaving (In other words processing in the multiplexer 8.)

In this case, the bit quantity between frames corresponding to the encode units A, B, C is set equal and the data quantity between the corresponding blocks set to be equal by encoding. This arrangement is intended to simplify the processing in the multiplexer 8 however the possibility of drastic discrepancies in image quality between the encode units A, B, C then arises. In contrast, another method is to set the frame data quantities equal by allocation of staff bits after having performed code processing to set the target data quantity in each frame according to the degree of difficulty. This method however has the drawback that a large amount of useless dummy data is created (shown by the hatched section in FIG. 11D), making it difficult to efficiently record video data onto the optical disk.

Another method is to make the data quantities match each other in block units. However since the number of GOP in each block is not necessarily set to a fixed value, this method is not practical in actual use.

Figure 11E:
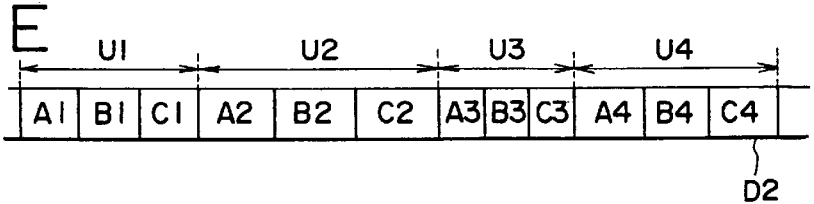

In this embodiment therefore, the GOP is set as the maximum unit comprising each block and the target bit quantity for a corresponding GOP set to be equal. (FIG. 11E).

Figures 12A, 12B, 12C, 12D, 12E:
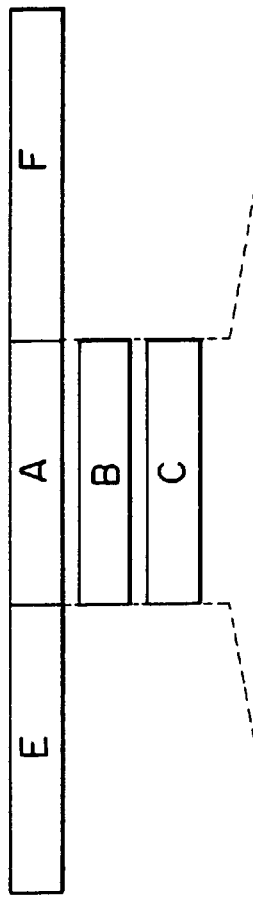
FIGS. 12A through 12E are all concept views illustrusting additional seamless angles.

In other words, the main controller 11 sequentially detects and arranges the maximum value for the degree of difficulty GOP DIF between GOP (FIGS. 12B through 12C) corresponding to the encode units A, B and C comprising the seamless angle as shown in FIG. 12. The arrangement of this detected degree of difficulty is set as a common degree of difficulty in encode units A, B, C (FIG. 12E). When the degree of difficulty DIF for the encode units A, B, C is processed as weighted values in step S32, the main controller 11 implements step SP35 by means of this weight-processed degree of difficulty.

When the degree of difficulty for the seamless angle is corrected in this way, the main controller 11 shifts to step SP36 and calculates the total sum DIF SUM for the degree of difficulty for all frames of video data D1. Here, the main controller 11 uses the weight-processed degree of difficulty of step SP32. The degree of difficulty detected in step SP36 is also used for the encode unit comprising the seamless angle.

Next, the main controller 11 shifts to step SP37, calculates the evaluation factors for allocating the target bit quantity in GOP units. Here, the main controller 11 calculates the evaluation factors Y=AX with the numerical processing shown in FIG. 13. In this FIG. 13, the GOP MAXRATE and the GOP MINRATE are the maximum and minimum rates allowable in the GOP.

$$A = \frac{SUPPLY\ BYTE}{DIF\ SUM} \quad (2)$$

Next, the main controller 11 shifts to step SP38 of (FIG. 9) and utilizes the evaluation factors Y=AX to allocate the target bit quantity GOP TGT for each GOP by implementing the numerical processing in the following equation. The GOP DIF is the sum of the degree of difficulty for each GOP detected in step SP34. Thus the main controller 11 allocates the target bit quantity for each GOP according to the degree of difficulty.

$$GOP\ TGT = A \times GOP\ DIF \quad (3)$$

Figure 13:
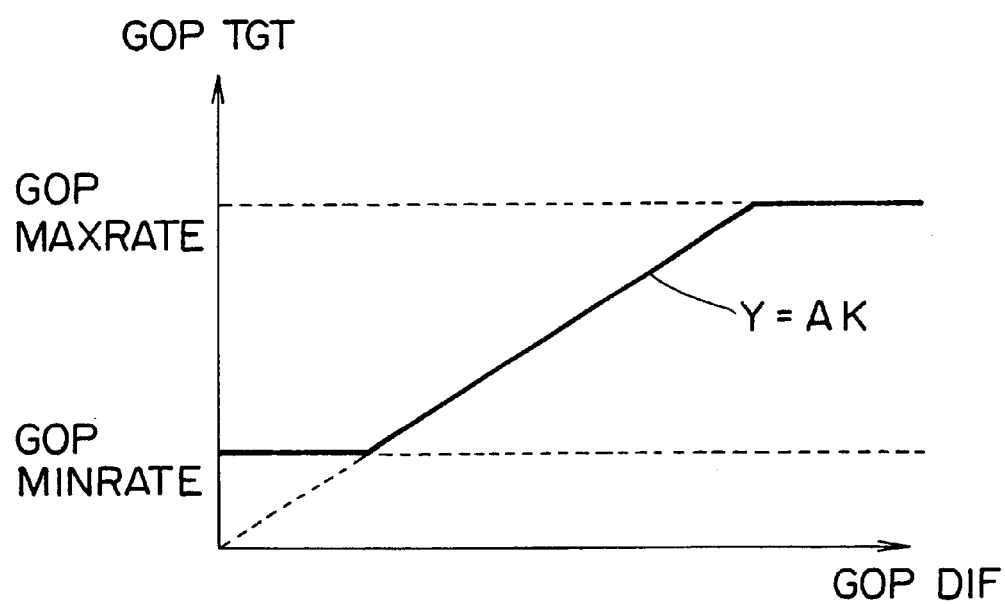
FIG. 13 is characteristic curve graph showing the evaluation function used for allocating target bits for each GOP.
Figure 14A:
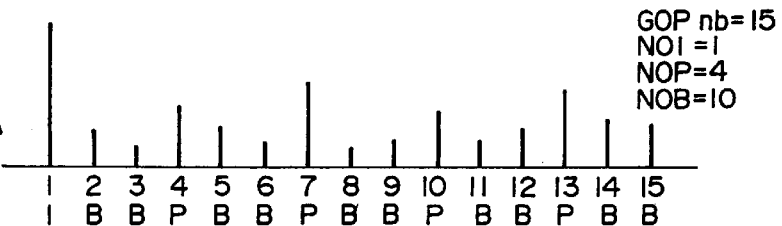
FIGS. 14A through 14E are characteristic curve graphs showing a different GOP for frame numbers.
Figure 14B:
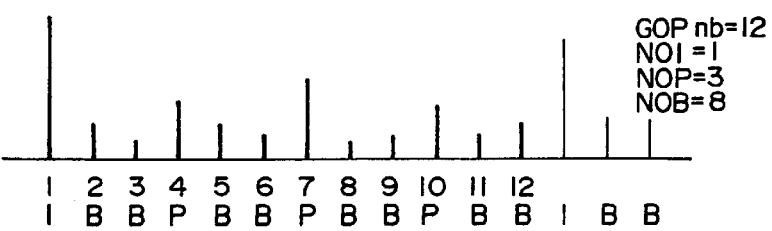
Figure 14C:
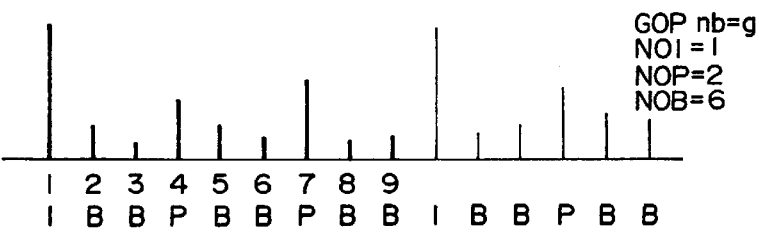
Figure 14D:
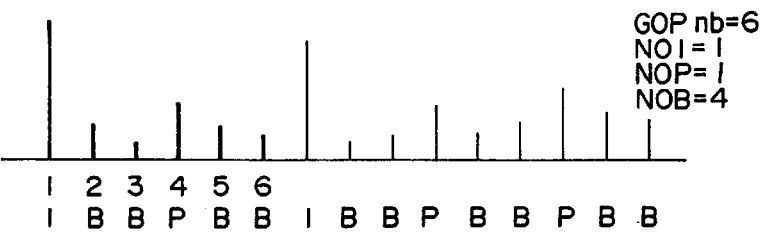
Figure 14E:
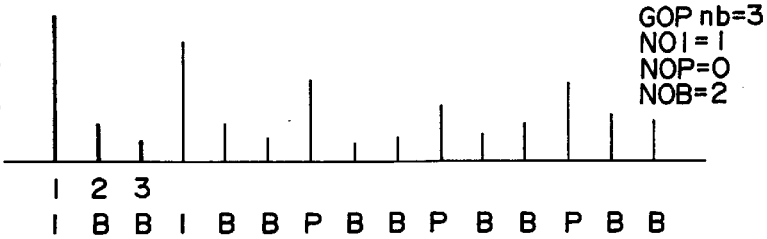

Next, the main controller 11 shifts to step SP39, and allocates the target bit quantity to each frame within the GOP. After the main controller 11 has proportionately distributed to each frame, the target GOP bit amount calculated by means of Formula 3, the correction GOP RATE value is calculated by means of the numerical process in the following formula and the proportionally allocated target bit value TGT is corrected as needed according to the correction GOP RATE value. The main controller 11 thus corrects the target bit quantity of each frame according to the structure of each GOP. Along with limiting the range of the maximum rate of the GOP MAXRATE and the minimum rate of the GOP MINRATE for the target bit quantity of each GOP as shown in FIG. 13; the target bit quantity of each frame is limited to a specified range within MAXBYTES and this limited target bit quantity corresponds to the ratio of the degree of difficulty of each frame.

$$GOP\ RATE = \frac{GOP\ TGT}{GOP\ nb \times C} \times RATE\ ADJUST \quad (4)$$

-continued $$\text{RATE ADJUST} = \frac{\begin{array}{c}AVR\ Ir \times NOI + AVR\ Pr \times \\ NOP + AVR\ Br \times NOB\end{array}}{\begin{array}{c}AVR\ Ir \times AVR\ NOI + AVR\ Pr \times \\ AVR\ NOP + AVR\ Br \times AVR\ NOB\end{array}}$$
$$= \frac{AVR\ Ir + AVR\ Pr \times NOP + NOB}{\begin{array}{c}AVR\ Ir + AVR\ Pr \times \\ AVR\ NOP + AVR\ NOB\end{array}}$$

(5)

Here, the RATE ADJUST is the correction value used when calculating the GOP RATE correction value. In this formula, C is a constant and GOP nb is the GOP length displayed in the number of frames. AVR Ir, AVR Pr and AVR Br are respectively the degree of difficulty rates for the I, P, B picture based on the B picture in the GOP. Also in the formula, NOI, NOP, NOB are the number of frames for the I, P, B pictures inside each GOP. Further, AVR NOI, AVR NOP, AVR NOB are average values of the NOI, NOP, NOP in the entire GOP. Accordingly, in this embodiment, when the number of GOP frames is 15 frames, 12 frames, 9 frames, 6 frames and 3 frames, the respective GOP nb, NOI, NOP, NOB are respectively the values shown in FIG. 14 (FIGS. 14A through 14E).

Thus, the main controller 11 uses the numerical processing in Formulas 4 and 5 to correct the changing bit quantity (GOP TGT/GOP nb×C) by using the RATE ADJUST correction value according to the desired GOP frame number and calculate the GOP RATE correction value. The factors of Formulas 4 and 5 also appear in the following formulas.

$$AVR\ NOI = NOI = 1 \tag{6}$$

$$AVR\ Br = 1 \tag{7}$$

$$AVR\ Ir = \frac{AVR\ I\ DIF}{AVR\ B\ DIF} \tag{8}$$

$$AVR\ Pr = \frac{AVR\ P\ DIF}{AVR\ B\ DIF} \tag{9}$$

$$AVR\ NOP = \frac{\sum NOP}{TOTAL\ GOP\ NUMBER} \tag{10}$$

$$AVR\ NOB = \frac{\sum NOB}{TOTAL\ GOP\ NUMBER} \tag{11}$$

$$AVR\ I\ DIF = \frac{\sum I\ DIF}{TOTAL\ GOP\ NUMBER} \tag{12}$$

$$AVR\ P\ DIF = \frac{\sum P\ DIF}{TOTAL\ GOP\ NUMBER / \sum NOP} \tag{13}$$

$$AVR\ B\ DIF = \frac{\sum B\ DIF}{TOTAL\ GOP\ NUMBER / \sum NOP} \tag{14}$$

Here, AVR I DIF, AVR P DIF, AVR B DIF are average values for the degree of difficulty of the I, P, B, pictures of each GOP. ΣNOP and ΣNOB are the number of frames for the P, B pictures. Also, the TOTAL GOP NUMBER is the number of GOP. Accordingly, the AVR Ir and AVR Pr are respectively shown in the next formulas.

$$AVR\ Ir = \frac{\sum I\ DIF}{\sum B\ DIF} \times \sum NOP \tag{15}$$

$$AVR\ Pr = \frac{\sum P\ DIF}{\sum B\ DIF} \times \frac{\sum NOB}{\sum NOP} \tag{16}$$

Here, in a continuous GOP in a sequence of I, B, B, P, B, B, P pictures, when for instance the AVR NOP and AVR NOB are respectively values of 3 and 8 and the AVR Ir and AVR Pr are respectively values of 4 and 2, the NOP and NOB will respectively be values of 2 and 4 so that the RATE ADJUST correction value will be a ⅔.

Based on the GOP correction value obtained in this way, the main controller 11 determines the target bit quantity GOP TGT for the GOP corresponding to the minimum rate GOP MINRATE and maximum rate GOP MAXRATE. In other words, when the correction value GOP RATE does not exceed the minimum rate GOP MINRATE and maximum rate GOP MAXRATE values, the target bit quantity TGT1 for each frame is set with the numerical process in the next formula.

$$TGT = \frac{GOP\ TGT \times DIF}{GOP\ DIF} \tag{17}$$

Here, when the correction value GOP RATE exceeds the maximum rate GOP MAXRATE allowed in the GOP, in the numerical process in the next formula, the maximum rate GOP MAXRATE is divided by the GOP RATE to obtain the TGT ADJUST correction factor. The target bit quantity TGT is then corrected by means of this TGT ADJUST correction factor and the target bit quantity TGT1 is thus set for each frame.

$$TGT\ ADJUST = \frac{GOP\ MAXRATE}{GOP\ RATE} \tag{18}$$

$$TGT1 = TGT \times TGT\ ADJUST \tag{19}$$

Here, replacing Formula 19 with Formula 4 allows the related expression of the next formula to be obtained.

$$TGT1 = TGT \times \frac{GOP\ MAXRATE}{GOP\ RATE} \tag{20}$$
$$= \frac{TGT}{GOP\ TGT} \times GOP\ MAXRATE \times \frac{GOP\ nb \times C}{RATE\ ADJUST}$$

This allows the main controller 11 to set the target bit quantity TGT1 for each frame, in order to limit the data quantity of each GOP by means of the maximum rate GOP MAXRATE.

Accordingly, the main controller 11 can correct the target TGT according to the GOP structure by means of the degree of difficulty and the number of frames, according to changes in the number of GOP frames GOP nb on the right side of the Formula 20 and also the rate TGT/GOP TGT for the degree of difficulty TGT of the target frame corresponding to the degree of difficulty GOP TGT for the entire GOP. Further, in the RATE ADJUST correction value in the denominator shown in Formula 5, using the average values AVR NO1, AVR NOP, AVR NOB for the entire video data P allows the main controller 11 to correct the target bit quantity TGT according to the target GOP structure corresponding to the entire GOP structure of the video data D1. Thus the main controller 11 can effectively avoid deterioration in image quality for the entire video data D1 and perform bit allocation with good efficiency.

In contrast for the correction value GOP RATE, when the allowable minimum rate GOP MINRATE has been exceeded, the minimum rate GOP MINRATE is divided by the correction value GOP RATE to obtain the correction factor TGT ADJUST. The target bit rate TGT is then corrected by means of this correction factor TGT ADJUST and the target bit rate TGT1 for each frame then set.

$$TGT\ ADJUST = \frac{GOP\ MINRATE}{GOP\ RATE} \quad (21)$$

$$TGT1 = TGT \times TGT\ ADJUST \quad (22)$$

A related expression can also be obtained for Formula 22 by substituting in Formula 4 in the next formula.

$$TGT1 = TGT \times \frac{GOP\ MINRATE}{GOP\ RATE} \quad (23)$$
$$= \frac{TGT}{GOP\ TGT} \times GOP\ MINRATE \times \frac{GOP\ nb \times C}{RATE\ ADJUST}$$

The main controller 11 thus restricts the minimum rate GOP MINRATE for each GOP data quantity to set the target bit quantity TGT1 for each frame. In this case also, the target bit quantity TGT1 is corrected according to the GOP structure by means of the degree of difficulty and the number of frames. This target bit quantity TGT1 is also corrected according to the target GOP structure corresponding to GOP structure for the entire video data D1. This process effectively prevents a deterioration in image quality for the entire video data D1 and performs bit allocation with good efficiency.

Thus when the target bit is allocated in this way, the main controller 11 shifts to step SP40 and calculates the VBV (video buffing verifier). In other words, when a multiplex stream is generated in this type of authoring device 1, generating a multiplex stream to constantly maintain a fixed level in the buffer memory of the playback device is necessary. Incidentally, decoding of continuous video data is difficult if the video data in the buffer memory to this playback device cuts off.

In this embodiment, the VBV indicates the remaining video data in the emulated buffer of the playback device when decoding continuous video data with the target bit quantity and is expressed by the following formula.

$$Occupancy\ up(0) = VBVMAX \times \frac{2}{3} \quad (24)$$

$$Occupancy\ down(k) = Occupancy\ up(k) - TGT(k) \quad (25)$$

$$Occupancy\ up(k+1) = Occupancy\ down(k) + \quad (26)$$
$$SYSTEM\ SUPPLY$$

$$SYSTEM\ SUPPLY = MAXRATE[bps] \times kT \quad (27)$$

Figure 15:
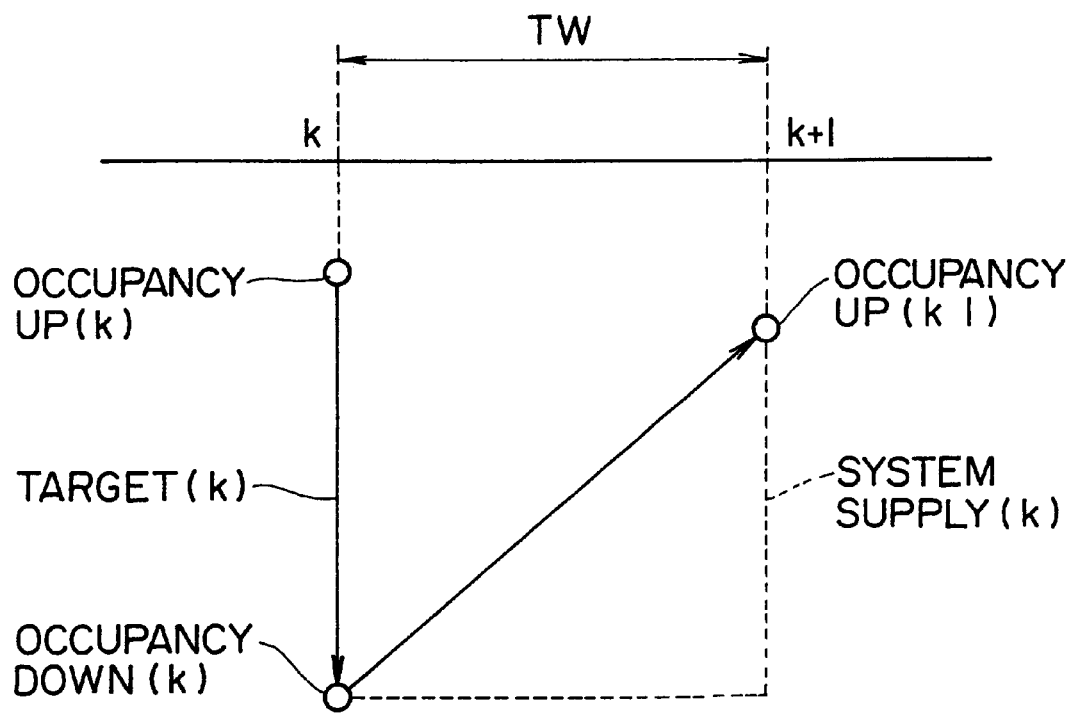
FIG. 15 is a characteristic curve graph illustrating the VBV.

Here, the SYSTEM SUPPLY is the data transfer speed from the optical pickup in the playback system. A proportional coefficient kT is multiplied by the maximum transfer speed of the optical disk format and a value obtained. Here, kT is a value larger than 1. Further, the Occupancy down(k) and the Occupancy up (k+1) as shown respectively in FIG. 15, the video data is intermittently read out and decoded for each single frame, at a period TW. The Occupancy down(k) and the Occupancy up (k+1) indicate right after readout, the residual video data in the buffer when the data in the buffer is at its lowest point and also, right before the subsequent readout indicate the residual video data in the buffer when the data quantity has increased to a maximum. In this embodiment, at the start of calculation of the VBV by Occupancy up(0), the decode is assumed to start when approximately two-thirds of the video data for playback has accumulated in the buffer memory.

The main controller 11 then implements in sequence the numerical processing of Formulas 24 through 27 for each encode unit and as shown in FIG. 16, calculates (FIGS. 16A and B) the buffer memory with VBV changing sequentially between the maximum value VBVMAX and the minimum value VBVMIN according to target bit quantity of each frame. Here, the maximum value VBVMAX is equivalent to the buffer memory capacity on the playback side and the minimum value VBVMIN shows when the remaining quantity is zero (0). Accordingly, for the I picture and P picture shown with the numerals 1, 4, 7 if the VBV falls below the minimum value VBVMIN then the decoding of consecutive video data for playback might temporarily cut off.

When the main controller 11 calculates the VBV in this way, the operation next shifts to step SP41 and when the I picture and P picture show the numerals 1, 4,7, the target bit quantity is reduced to prevent the VBV from falling below the minimum value VBVMIN. However, simply controlling the VBV target bit quantity at this time to prevent the VBV from falling below the minimum value VBVMIN can cause disturbances in the balance of the target bit quantity for each picture which was set according to the degree of difficulty and cause a corresponding drop in image quality. In this case also, what controlled the target bit quantity to prevent dropping below the minimum value VBVMIN was a drastic drop in the target bit quantity of the I picture.

Thus when the Occupancy min is less than the VBVMIN, the main controller 11 implements the numerical processing in the next formula and calculates the correction value TGT1. The Occupancy min is the minimum value VBV for each GOP.

$$TGT\ ADJUST1 = \frac{(VBVMAX - VBVMIN)}{VBVMAX - Occupancy\ min} \quad (28)$$

The main controller 11 then implements the numerical processing of the next formula by utilizing the TGT1 correction value that was calculated and corrects the target bit quantity TGT1 for each frame. Thus when the main controller 11 controls the target bit quantity per VBV, the target bit quantity of each picture is corrected by the rate that was initially set. Thus the disturbance in the balance of the target bit quantity between the I, P and B picture can be effectively avoided and a deterioration in image quality thus prevented.

$$TGT2 = TGT1 \times TGT\ ADJUST \quad (29)$$

As shown in FIG. 17, in bit allocation according to degree of difficulty (FIG. 17A1), the VBV has large fluctuations (FIG. 17A2). In addition to the limit imposed by the maximum value MAX BYTES (FIG. 17B1) is for instance the large rate fluctuation that can be seen up to this time in the target bit quantity between Frame No. 1 and Frame No. 4. Further, if frames exist that exceed the minimum value VBVMIN even in this state (FIG. 17B2) then limiting of the target bit quantity by means of VBV is required. Accordingly, when the target bit quantity reduces the N frames to equal quantities (FIGS. 17C1 and C2) by means of the numerical processing of the next formula then, for instance the bit quantity ratio between Frame No. 2 and Frame No. 3 can be seen to fluctuate drastically. Here N is the number of GOP frames.

$$DELTE = \frac{(VBVMAX - Occupancy\ down)}{N} \quad (30)$$

$$TGT3 = TGT - DELTE \quad (31)$$

As shown in FIG. 18, in the process of this embodiment, even if with a target item for processing identical to FIG. 17 (FIGS. 18A1 and 18A2), bits can be allocated by means of Formulas 4 and 5 (FIGS. 18B1 and 18B2) and an initial target bit quantity maintained between each frame. Also, even if frames are present that exceed the minimum value VBMIN, the target bit quantity can be corrected by the numerical processing of Formula 29 and 30 (FIGS. 18C1 and 18C2) and the initial bit quantity rate can be maintained.

After the main controller 11 has sequentially corrected target bit quantities by means of the corrected VBV value, the operation shifts to step SP24 and the target bit quantity is corrected by means of the VBV boundary conditions. Here, the main controller 11 corrects the target bit quantity TGT2 so that the remaining video data quantity will not reach zero (0) in the buffer memory for playback, even when the GOP are being continuously played back. In other words, the main controller 11 detects a GOP whose VBV end frame value has become small in comparison to the beginning VBV frame. The target bit quantity TGT2 which is larger than the lead VBV is then corrected so that end frame VBV value does not become larger than the specified value.

In other words, when decoding continuous GOP, the VBV (Occupancy up (0)) at the beginning of each encode unit becomes the end VBV for the immediately prior encode unit. Thus when sequentially issuing GOP and a GOP is generated whose end frame VBV value has become small versus the beginning frame VBV, the remaining video data might reach zero (0) in the buffer memory for playback. So that in such cases, the decoding of continuous video data may suddenly cut off.

In such a case, if the target bit quantity TGT2 for each GOP is set so that rather than the (lead) beginning frame, the end frame VBV becomes larger than a specified value, then the remaining video data in the playback buffer memory can be prevented from becoming zero (0) regardless of the order in which the GOP are generated. Further, if the settings are made in the same way for multiangles, then the remaining video data in the playback buffer memory can be prevented from becoming zero (0).

More specifically, a surplus (VBV END-MARGIN) is calculated in order to set the end frame VBV larger than the beginning (lead) frame VBV by an amount equal to a specified margin. This surplus (VBV END-MARGIN) is distributed among the frames according to the target bit quantity of each frame and subtracted from the target bit quantity of each frame. Thus even when the main controller 11 limits the target bit quantity by means of the VBV boundary conditions, a drastic fluctuation in target bit quantity balance between the I, P, B pictures is prevented and consequently, bits are allocated in correct amounts and a deterioration in image quality can effectively be prevented.

Next, the main controller shifts to step SP43 and the surplus is calculated. Here, once the main controller 11 has summed the target bit quantity TGT2 for all frames of the video data D1, the result is subtracted from the total supply bites allocable to the video data to find the surplus bytes (REMAIN BYTES). In other words, the target bit quantity is corrected by means of various restrictions so that the initial and total supply bytes are compared and the difference taken when distributed to each GOP by means of the degree of difficulty. A surplus or remainder is obtained from this difference. The main controller 11 then reallocates this surplus or remainder within a specified restricted range and the image quality improves by an equivalent amount.

In other words, in step SP44, the main controller 11 determines whether or not the end conditions for bit allocation have been satisfied. Here, when the surplus (or remainder) has not decreased compared to the previous time, then the main controller 11 determines that end conditions have been satisfied. Further, when the calculation of the surplus exceeds 5 times, then the end conditions have also been determined to be satisfied. In such cases, the main controller shifts to step SP45 upon determining that negative results have been obtained.

Figures 19A, 19B:
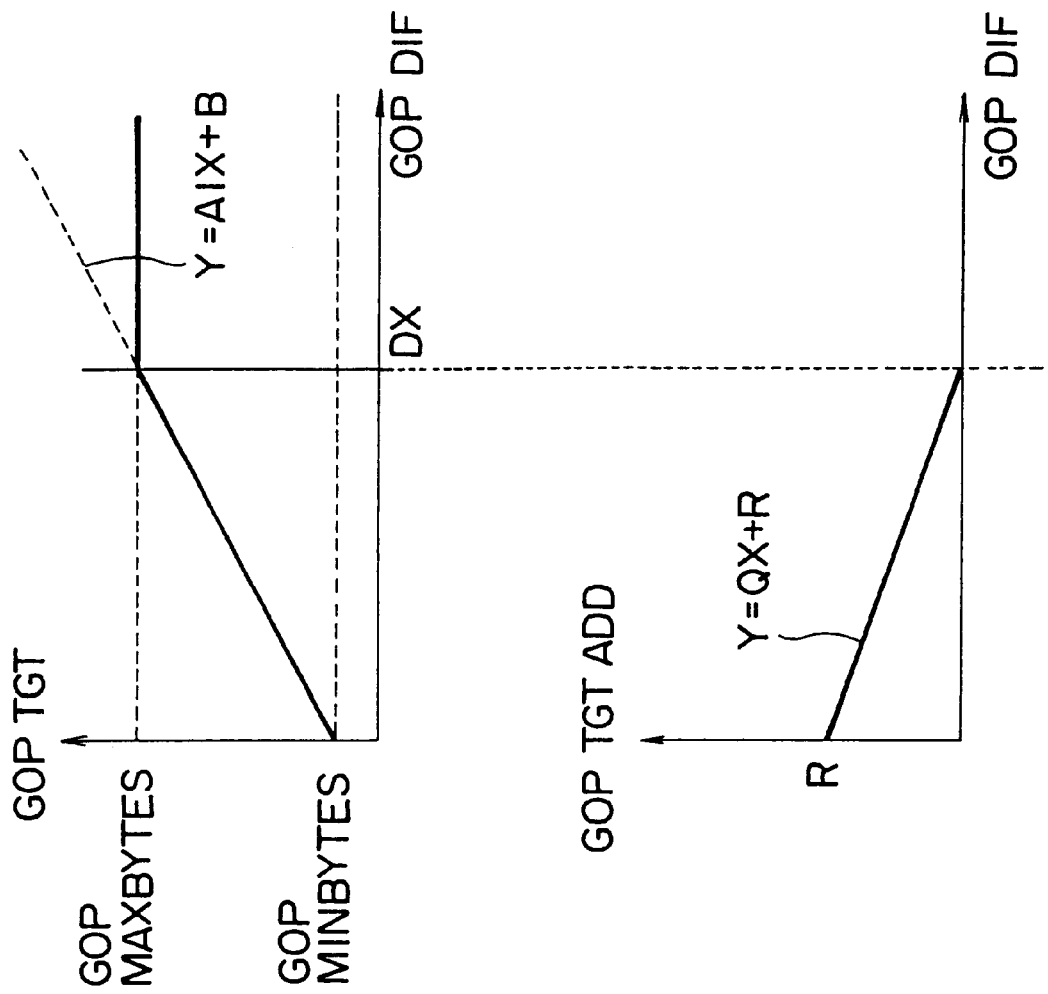
FIGS. 19A and 19B are characteristic curve graphs showing the evaluation function used allocating excess portions.

The main controller 11 implements the numerical process in the next formula and generates the evaluation factors Y=QX+R for allocating the surplus according to the degree of difficulty of each GOP. The main controller 11 then allocates the surplus so that the maximum value MAX BYTES allowed in the GOP are not exceeded. In other words, as shown in FIG. 19A, when the GOP degree of difficulty GOP DIF is set as the X axis and the target bit quantity for the GOP shown, the target bit quantity increases compared to the GOP DIF and so that when larger than a specified value of degree of difficulty DX, is maintained at the maximum value MAX BYTES.

Accordingly, the value gradually decreases as the degree of difficulty DX is approached for GOP corresponding to the maximum value MAX BYTES and the main controller 11 sets the evaluation factors (FIG. 19B) so that the surplus is not allocated to the degree of difficulty GOP DIF greater than this degree of difficulty DX. Here, excluding encode units other than for the multiangle, the degree of difficulty is sum total degree of difficult DIF for GOP less than the value DX and n is the number of their frames.

$$Q = \frac{REMAIN\ BYTES}{DIF\ SUM - DX \times n} \quad (32)$$

$$R = Q \times DX \quad (33)$$

When the evaluation factors for Y=QX+R are found, the main controller 11 shifts to step SP38 and implements the numerical processing in the following formula for encode units other than the multiangle. Thus the main controller 11 utilizes the evaluation factors Y=QX+R and distributes the surplus to the target bit quantity of each GOP other than the multiangle.

GOP TGT ADD=$Q$×TGT DIF+$R$ (34)

GOP TGT=GOT TGT+GOP TGT ADD (35)

Thus the main controller 11, after distributing the surplus GOP TGT ADD to each GOP shifts to step SP39 and as shown in the next formula, repeats the above described distribution to each frame.

$$TGT\ ADD = GOP\ TGT\ ADD \times \frac{DIF}{GOP\ DIF} \quad (36)$$

The main controller 11 thus repeats the process in steps SP38–SP39–SP40–SP41–SP42–SP43–SP44–SP45–SP38 to a maximum range of four times until the remainder (surplus) stops decreasing and gradually distributes the remainder (surplus) to the target bit quantity of each frame.

In the repetition of this process, the main controller 11 maintains the target bit quantity ratio as in the initial setting for each picture for correcting the target bit quantity with the VBV and for correcting the target bit quantity per the VBV boundary conditions, and the target bit quantity gradually increases. Here, the main controller 11 encodes the video data by adequately utilizing the bit quantity capable of being recorded on the optical disk.

When the main controller satisfies the process conditions by repeating the procedure related above, the operation moves from step SP44 to step SP46 and this process is now ended. The main controller 11 then controls the operation of the encoder 12 by means of the control program 16 according to the target bit quantity as set for each frame as described above. Thus, the video data D1 is gradually encoded by the quantized step size according to the target bit quantity.

(4) Customized Processing and Recalculating Bit Allocation

In the preview processing, the coding conditions set as described above, are checked by the operator on the monitor 13 . Here, when the operator selects customized processing, the main controller 11 sets the No.2 weighted quantities approximating the weighted quantities listed in FIG. 10 from the zone specified by the operator and using the encode unit matching that selected by the operator (FIG. 4).

Further, when customizing is finished by the operator, the main controller 11 recalculates the bit allocation. At this time, the main controller 11 processes the No.2 weighted quantities for the degree of difficulty of the zone specified by the operator. The main controller 11 now reimplements the above related processes in FIG. 1 and FIG. 9 with this weighted degree of difficulty and thus reperforms calculation of the target bit quantity. Thus, in this embodiment, even if the operator changes to different coded conditions, a suitable bit allocation can be obtained.

(5) Operation of the Embodiment

In the configuration as described above, once the authoring device 1 (FIG. 2) has entered the recorded information such as from magnetic tape into the menu signal processor 2, title signal processor 5, audio signal processor 6, and video signal processor 7, the conditions are then set by the supervisor 3 and coding processing commences by means of this menu signal processor 13. The now coded video data is recorded onto the hard disk 4 and the generated data is sent as processing results to the supervisor 3. Further, a multiplex file is made from the processing results of the multiplexer 8 and the streamer 9 complies with this multiplex file to gradually multiplex the video data that was recorded onto the hard disk 4 and issue the data as a multiplex stream.

When multiplexing starts, the data quantity USE BYTES to be assigned to the video data from the bit quantity of the optical disk is determined in the supervisor 3. This data quantity USE BYTES is reported to the main controller 11 of the video signal processor 7. Also, the edit file for sequentially specifying the encode unit comprising the encoding target item is reported to the main controller 11 of the video signal processor 7. The video data D1 is then generated from the video tape recorder 10 according to this edit file. Further, a weighted table (FIG. 10) is made in response to the operator's instructions. This weighted table is reported along with the coding conditions to the main controller 11 of the video signal processor 7.

When the conditions are set in this way, the authoring device 1 is set with the detailed conditions for code processing of the video data D1 per the main controller 11 of the video signal processor 7. After the authoring device 1 has separated each picture sequentially into 15 frame units and set the GOP, the I, P, and B pictures are then set inside each GOP (FIG. 6). The authoring device 1 code processes the video data D1 in encoder 12 by means of the fixed quantized step in compliance with the I, P, B picture which were set as just described. The bit quantity generated by each picture is sequentially reported to the main controller 11 and the degree of difficulty of the coded item then measured (FIG. 8).

Simultaneous with measurement of this degree of difficulty, information necessary for detecting scene changes is acquired. The I picture is reset in the main controller 11 by means of this information. The I picture is also reset by according to the multiangle of the encode unit and according to the chapter settings (FIG. 7). The GOP is also reset so that one GOP can be fit within 15 frames. The degree of difficulty that was measured, is corrected in order to correspond to these resettings.

Next, the authoring device 1 sets the target bit quantity for the coding process by means of the degree of difficulty. This setting allows a common degree of difficulty to be used by the seamless angle coding units by sequentially detecting and arranging the maximum value for the degree of difficulty GOP DIF among GOP corresponding to encode units that comprise the seamless angles. This allows the interleave units which are the largest structural units comprising the GOP to be used and set so that the matching GOP target bit quantities are equal, and consequently settings are made so that the data quantity between the corresponding blocks is equal (FIG. 11).

Next, weighted processing (FIG. 10) of the measured degree of difficulty measured per each picture setting is performed according to the weighted table that was previously set. This allows a large bit quantity to be assigned for encode units that the operator decides need higher image quality. Thus, a suitable bit allocation can be made even when the coding conditions at the encode unit are different.

The authoring device 1 next assigns the actual allocable SUPPLY BYTE bit quantity by means of the degree of difficulty GOP DIF for each GOP, thus setting the target bit quantity GOP TGT for each GOP. Afterwards, in each GOP, the target bit quantity GOP TGT is allocated to each frame according to the degree of difficulty of each frame. Once the target bit quantity GOP TGT has been set in each frame according to this degree of difficulty, the target bit quantity is corrected (Formulas 4 to 23) according to the number of frames, degree of difficulty, and according to the GOP structure of the target item for processing that corresponds to the overall GOP structure of the video data D1.

This process allows the target bit quantity rate initially set in each frame according to the degree of difficulty to be maintained and set so that the maximum rate GOP MAXRATE and minimum rate GOP MINRATE are not exceeded. Further, even when the number of frames per the GOP is different, initially, the target bit quantity ratio will be maintained to that set in each frame according to the degree of difficulty and the target bit quantity corrected. Thus, when for instance the bit rate is detected simply in GOP units, a high bit rate will be set for GOP with a shorter length. Thus if the target bit quantity is regulated simply by the bit rate, then the data quantity assigned to the I picture will drastically diminish in GOP with a short length, causing image quality to deteriorate.

The authoring device therefore in order to prevent this deterioration in image quality, continues to allocate large bit quantities to I pictures requiring large data quantities and sets B and P picture target bit quantities to match this I picture quality. Thus a limited data quantity can be allocated in suitable amounts and compression of video data of high quality can be achieved.

When the target bit quantity GOP TGT has been corrected, the data quantity for the video data playback buffer is next calculated by decoding the video data from the calculated target bit quantity GOP TGT. The VBV is therefore calculated (Formulas 25 through 27). Further, this VBV calculation allows the target bit quantity to be detected for each GOP unit so that the video data will not cut off in the buffer memory (Formulas 28 and 29). In this correction, the target bit quantity is adjusted for each picture to match the initial setting rate and corrected so that the target bit quantity balance between the I, P, B pictures is not disrupted. Thus a limited data quantity is allocated in suitable amounts and compression of video data of high quality can be achieved.

Next the target bit quantity in the authoring device is corrected by means of the VBV boundary conditions. Here, even when each GOP is being continuously generated, the target bit quantity is corrected in the authoring device so that the end frame VBV is larger than the lead (beginning) frame VBV to ensure that the video data does not reach zero (0) in the playback buffer memory. In other words, a GOP in violation of this restriction are detected and a differential value (VBV END–MARGIN) required for setting the end frame VBV to be larger than the beginning (lead) frame VBV just by a specific margin is calculated. Correction is then made by distributing this (VBV END–MARGIN) to each frame according to the target bit quantity of each frame.

Thus, even when the target bit quantity is restricted by means of the VBV boundary conditions in the authoring device, the target bit quantity balance between the I, P, B pictures is not disrupted so that deterioration in image quality is effectively prevented by suitable bit allocation.

A series of corrections of video data D1 results in generation of a surplus. In the authoring device 1 a setting is made to prevent the target bit quantity from exceeding the MAX BYTES allowable in the GOP and based on the degree of difficulty the surplus (or remainder) is allocated to each GOP other than the multiangle. The target bit quantity of each frame is then set with the same type processing. This process in the authoring device of allocating this surplus (or remainder) allows sufficient capacity for recording onto an optical disk to be assigned to the video data and improves the video data image quality. This setting of target bit quantity and similar processing to allocate the surplus serves to prevent target bit quantity balance between the I, P, B pictures from being disrupted so that deterioration in image quality is effectively prevented by suitable bit allocation.

When coding conditions are set this way, the video data D1 is previewed by the operator. When the operator selects customize, the desired weighting quantity and zone selected by the operator are set. The degree of difficulty is weight-processed by these weighting factors and allocation of the bit quantity then repeated. Thus, suitable bit allocation can be performed even when coding conditions are changed and the video data D1 is coded by means of this bit allocation.

(6) Effect of the Invention

In the embodiment of this invention as configured above, when setting the target bit quantity for data compression based on the degree of difficulty set in the previous data compression process, the target bit quantity is set in GOP units and allocated to each frame after which this target bit quantity can be corrected according to the structure of each GOP so that the target bit quantity balance between the I, P, B pictures is not disrupted. Thus a limited data quantity can be allocated in suitable amounts and compression of video data of high quality can be achieved.

Restated, by correcting the target bit quantity according to the number of frames of the GOP, a correction to a suitable target bit quantity can be made even when the GOP frame number is different.

Further, the target bit quantity can be corrected according to the degree of difficulty of the frame corresponding to the GOP degree of difficulty and by correcting the target bit quantity according to each block structure, the balance of the initially set target bit quantity can be maintained as is, per the degree of difficulty, and the target bit quantity thus corrected.

Further in making corrections per the VBV, by making the target bit corrections according to the degree of difficulty, the target bit quantity can be corrected while still maintaining the balance of the initially set target bit quantity unchanged.

(7) Other Embodiments

The above embodiment described processing applicable to this invention in a video signal processor 7, however this invention is not limited to this method and may process the video data in the same way in the title signal processor 5 and menu signal processor 2 so that the method of this invention is applicable to both this title signal processor 5 and menu signal processor 2 and suitable bit allocation may also be performed among this title video data and menu video data.

Further, the above embodiment described detecting the degree of difficulty corresponding to the picture array after resetting, by correcting the degree of difficulty measured after resetting of the picture, however this invention is not limited to this method and may measure the degree of difficulty from the picture array after resetting by means of the actual coding process after reset of the picture.

The above embodiment also described a method for coding of video data by means of MPEG and compressing the data however this invention is not limited to this method and is widely applicable to a variety of coding techniques to code the video data and perform data compression.

Still further, this embodiment described an authoring device for an optical disk applicable to this invention however this invention is not limited to this method and is widely applicable to other methods and configurations such as when recording on a variety of other recording mediums or further when transmitting video data by means of a variety of transmission paths.

This invention therefore, configured as described above, allocates the target bit quantity to each frame in units of specified blocks and then corrects this data by means of the individual block structure when setting the target bit quantity for data compression based on the data quantity detected in the previous data compression process, so that a limited data quantity can be allocated in suitable amounts and compression of video data of high quality can be achieved.

What is claimed is:

1. A data compression device that switches between intra-frame coding and inter-frame coding for compressing the desired video data wherein;

said video data is compressed by means of a previous data compression process and the data quantity resulting from the process is detected, conditions for said data compression are set by means of the target bit quantity established based on the data quantity resulting from said previous data compression process, said video data is compressed according to conditions set for the data compression processing, conditions set for said data compression process are:

one intra-frame coding to the next intra-frame coding is specified as one block, a data quantity assigned to the entire video data is allotted to each block based on data quantity from said processing results, and said target bit quantity is set for each block after which said target bit quantity is equally allotted to each frame of said block, and in the process for allocating said target bit quantity, the target bit quantity is corrected according to the individual block structure after allocating said target bit quantity to each said block in order to match the data quantity ratio from said processing results in each block.

2. A data compression device of claim 1 wherein the target bit quantity is corrected according to the structure of each block by correcting said target bit quantity according to the number of frames of each block.

3. A data compression device of claim 2 wherein the target bit quantity is corrected according to the structure of each block by correcting said target bit quantity according to the degree of difficulty of each frame versus the degree of difficulty of each block.

4. A data compression device of claim 1 in which in correction of said target bit quantity : while said compressed video data is stored in a buffer memory of specified capacity at a specified data transfer speed, said video data stored in said buffer memory is gradually data-elongated and sent at a specified data transfer speed, and said target bit quantity is corrected according to the data quantity ratio from said processing results for each frame so that the data quantity of said video data in said buffer memory is maintained at the specified value or higher.

* * * * *